US012565384B2

(12) United States Patent
Yamaguchi

(10) Patent No.: US 12,565,384 B2
(45) Date of Patent: Mar. 3, 2026

(54) CONVEYANCE PATH SWITCHING APPARATUS, CONVEYANCE SYSTEM, AND CONVEYANCE PATH SWITCHING METHOD

(71) Applicant: YAMAHA HATSUDOKI KABUSHIKI KAISHA, Iwata (JP)

(72) Inventor: Kota Yamaguchi, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 123 days.

(21) Appl. No.: 18/728,558

(22) PCT Filed: Feb. 25, 2022

(86) PCT No.: PCT/JP2022/007999
§ 371 (c)(1),
(2) Date: Jul. 12, 2024

(87) PCT Pub. No.: WO2023/162167
PCT Pub. Date: Aug. 31, 2023

(65) Prior Publication Data
US 2025/0083904 A1 Mar. 13, 2025

(51) Int. Cl.
*B65G 47/64* (2006.01)
*B65G 54/02* (2006.01)

(52) U.S. Cl.
CPC ............. *B65G 47/64* (2013.01); *B65G 54/02* (2013.01)

(58) Field of Classification Search
None
See application file for complete search history.

(56) References Cited

U.S. PATENT DOCUMENTS 5,825,104 A * 10/1998 Kondo ................... H02K 41/03
310/12.24
6,734,583 B2 * 5/2004 Fujisawa .............. H02K 41/031
310/12.27

(Continued)

FOREIGN PATENT DOCUMENTS

CN 101081659 A * 12/2007 ............. B65G 37/02
CN 112009965 A * 12/2020 ............. B65G 47/80

(Continued)

OTHER PUBLICATIONS

International Search Report issued in PCT/JP2022/007999; mailed May 17, 2022.

(Continued)

*Primary Examiner* — Gene O Crawford
*Assistant Examiner* — Muhammad Awais
(74) *Attorney, Agent, or Firm* — Studebaker Brackett PLLC

(57) ABSTRACT

The support mechanism has a conveyor support member attached to the end portion of the movable linear conveyor and a single axis robot that is attached to a fixed linear conveyor and guides the conveyor support member in the Y direction. By the support mechanism having the conveyor support member and the single axis robot, the end portion of the movable linear conveyor can be firmly supported with respect to the fixed linear conveyor. The support mechanism has the conveyor support member attached to the end portion of the movable linear conveyor and the Y-axis conveyor guide that is attached to the fixed linear conveyor and guides the conveyor support member in the Y direction. By the support mechanism having the conveyor support member and the Y-axis conveyor guide, the end portion of the movable linear conveyor can be firmly supported with respect to the fixed linear conveyor.

20 Claims, 13 Drawing Sheets

(56) References Cited

U.S. PATENT DOCUMENTS

| | | | | |
|---|---|---|---|---|
| 8,134,258 B2 * | 3/2012 | Finkbeiner | ............ | F16C 29/008 310/12.31 |
| 8,497,643 B2 * | 7/2013 | Takagi | ................... | H02K 41/03 318/135 |
| 9,757,797 B2 * | 9/2017 | Urata | ................... | H02K 41/031 |
| 2008/0029238 A1 * | 2/2008 | Hunter | ................... | B22D 33/00 164/324 |
| 2011/0198947 A1 * | 8/2011 | Lin | ........................ | H02K 41/02 310/12.33 |
| 2013/0259628 A1 * | 10/2013 | Hirasawa | ............ | H01L 21/6773 414/754 |
| 2019/0131860 A1 * | 5/2019 | Suzuki | ..................... | B23Q 7/14 |
| 2019/0190366 A1 * | 6/2019 | Urata | ..................... | H02K 41/03 |
| 2021/0061577 A1 * | 3/2021 | Okazaki | .............. | B23Q 7/1447 |

FOREIGN PATENT DOCUMENTS

| | | | | | | |
|---|---|---|---|---|---|---|
| CN | 112408001 | A | * | 2/2021 | ............ | B65G 43/08 |
| JP | 2013213550 | A | * | 10/2013 | | |
| JP | WO2018055709 | A1 | | 2/2019 | | |
| JP | 2019103225 | A | * | 6/2019 | | |
| WO | WO-2021124439 | A1 | * | 6/2021 | ........... | H02K 41/031 |
| WO | WO-2021229781 | A1 | * | 11/2021 | ............. | H02K 41/02 |
| WO | WO-2021229782 | A1 | * | 11/2021 | ............. | H02K 41/02 |

OTHER PUBLICATIONS

Office Action issued in DE 11 2022 006 388.2; mailed by the German Patent and Trademark Office on Oct. 6, 2025.

* cited by examiner

F I G. 1 D
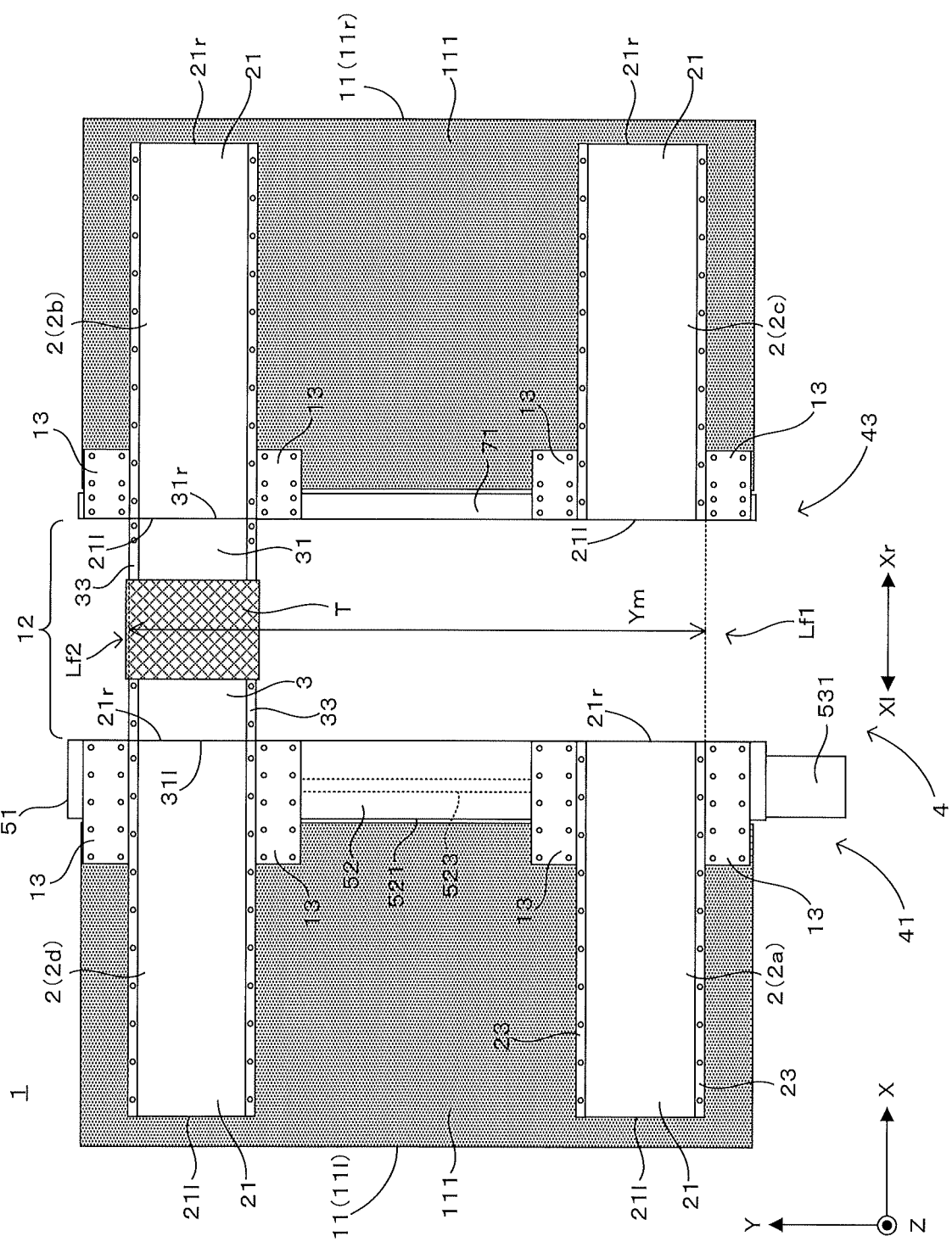

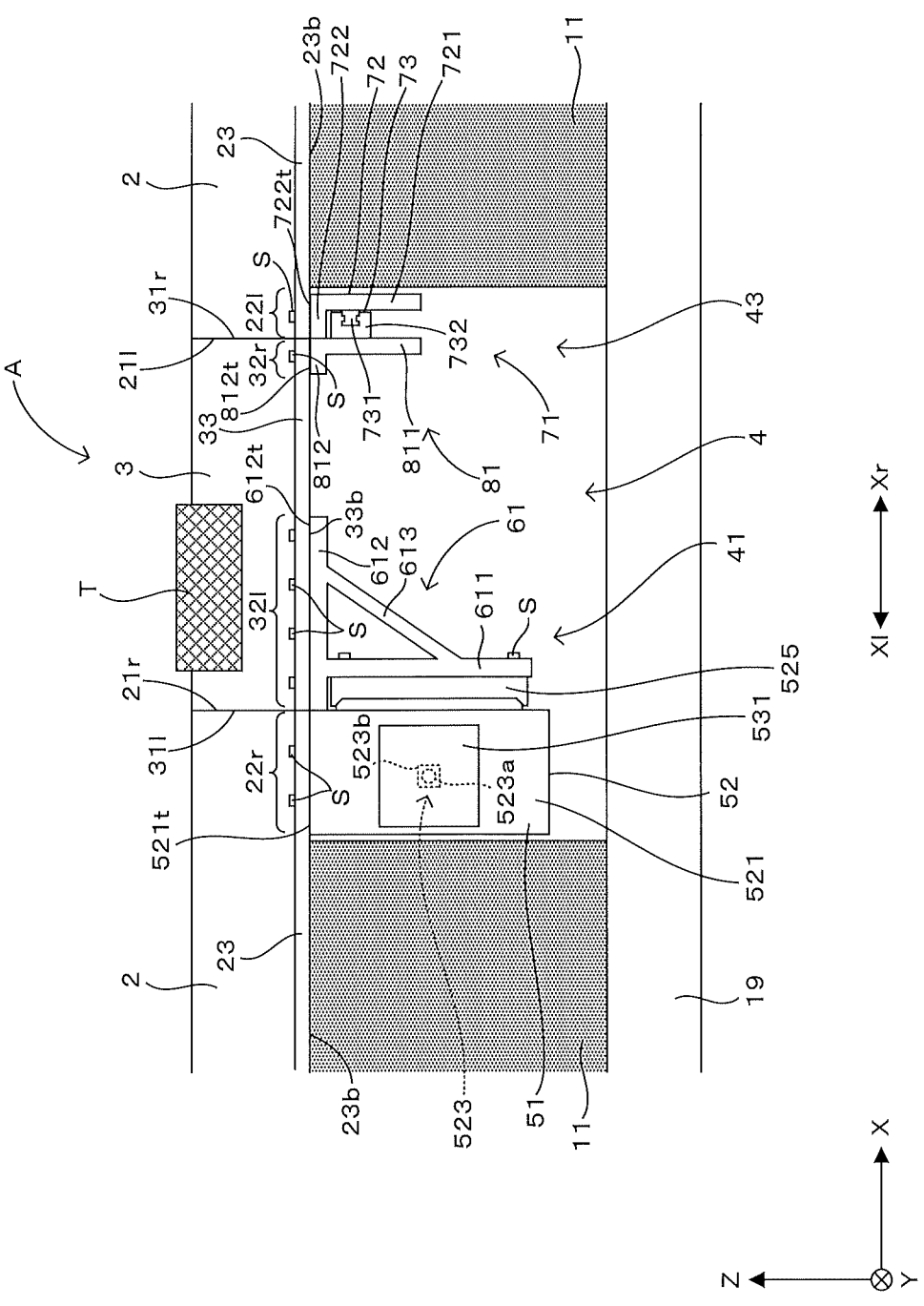
F I G. 3

F I G. 4
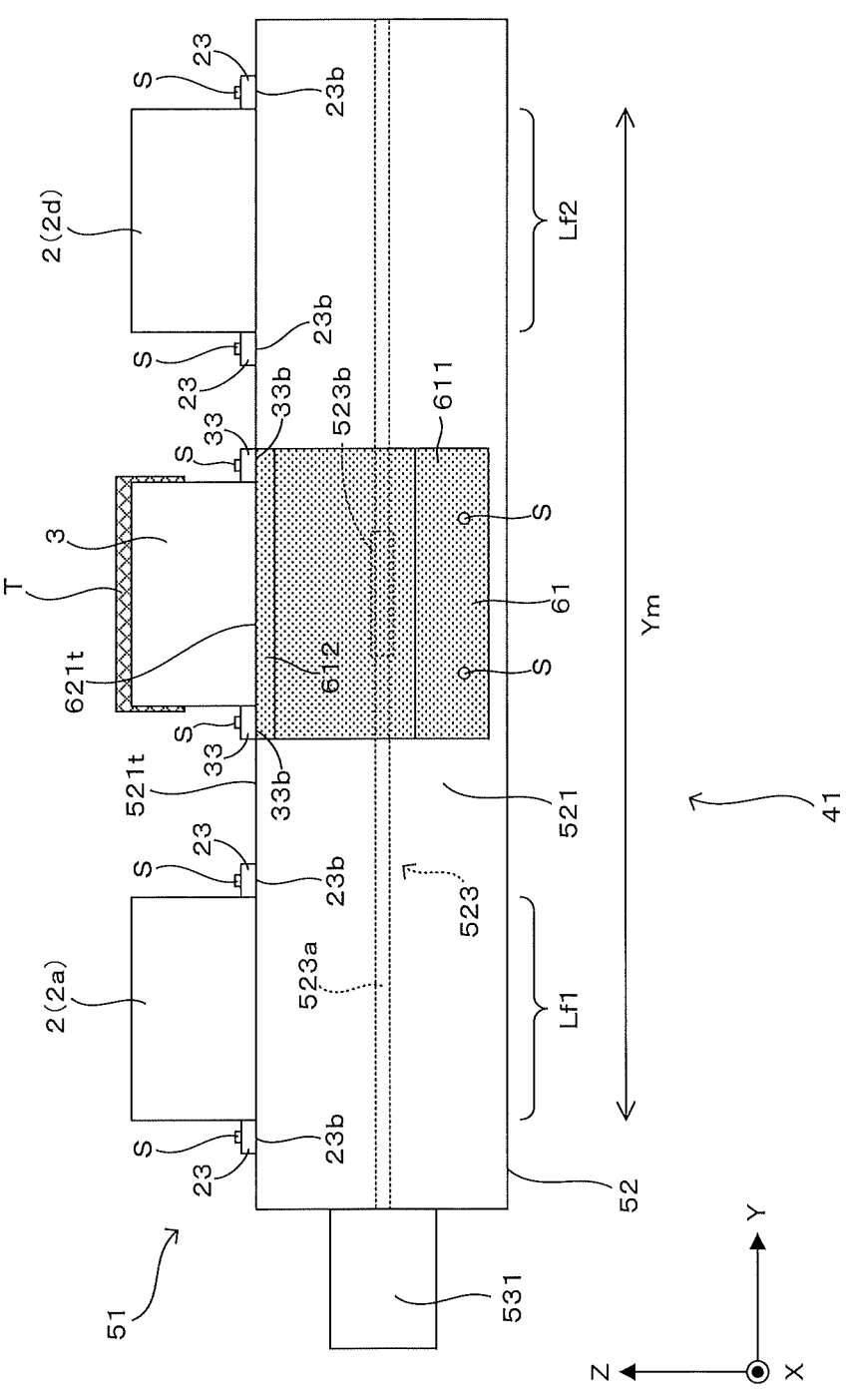

F I G. 5
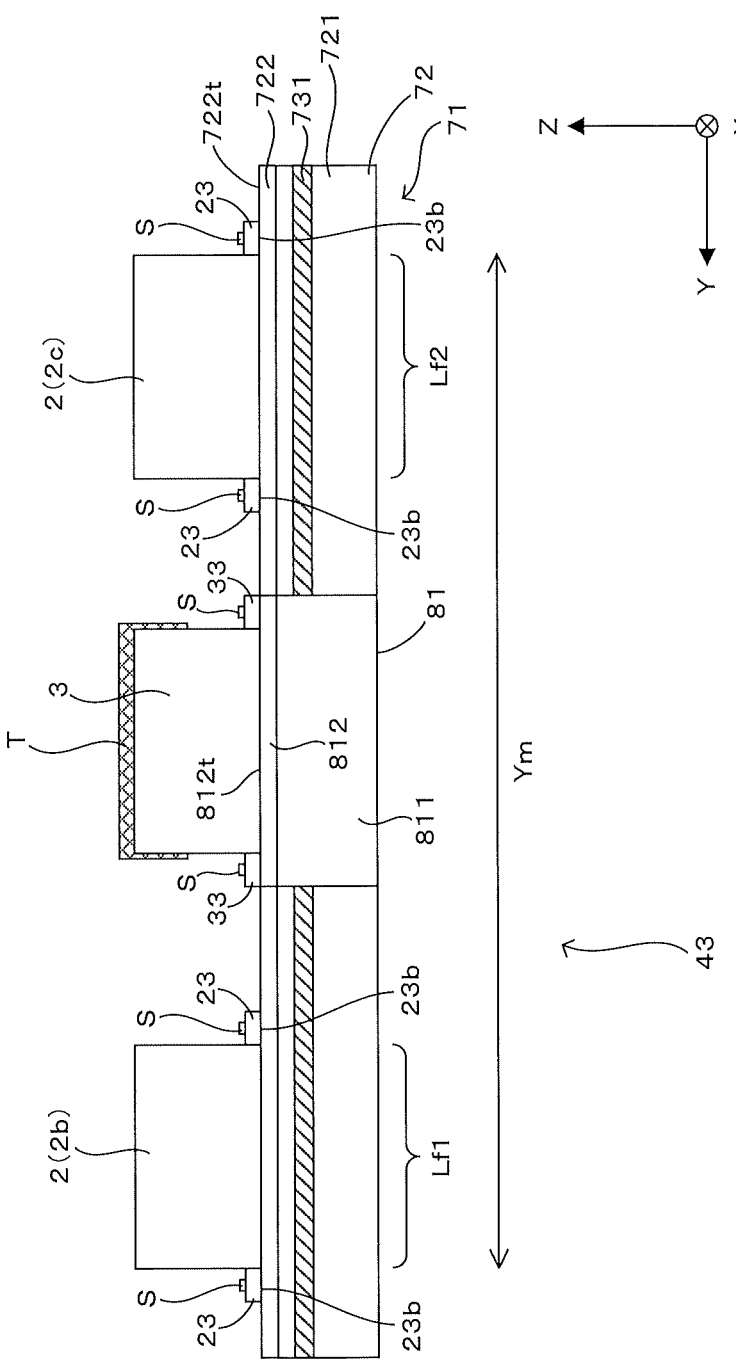

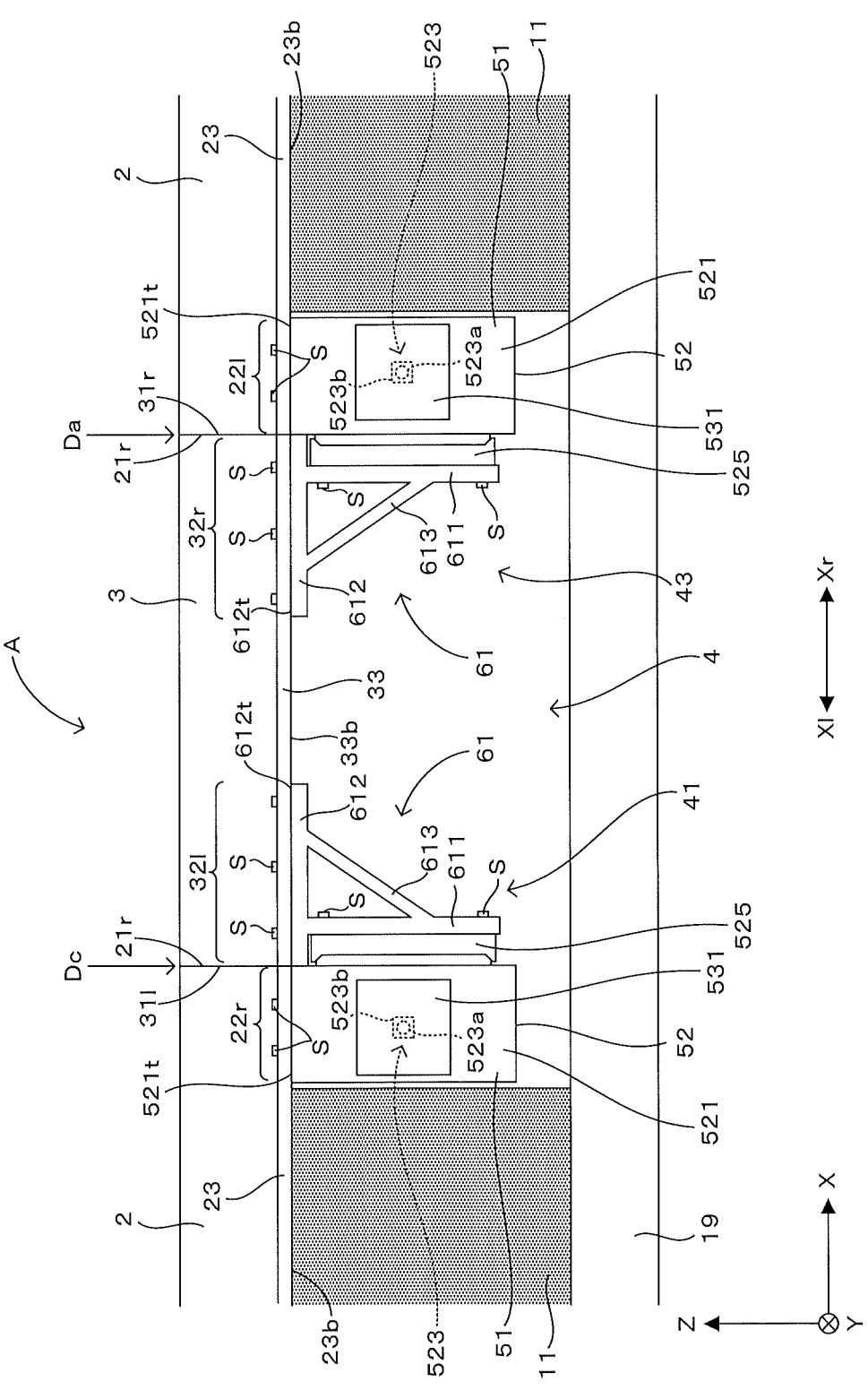
F I G. 6

F I G   7
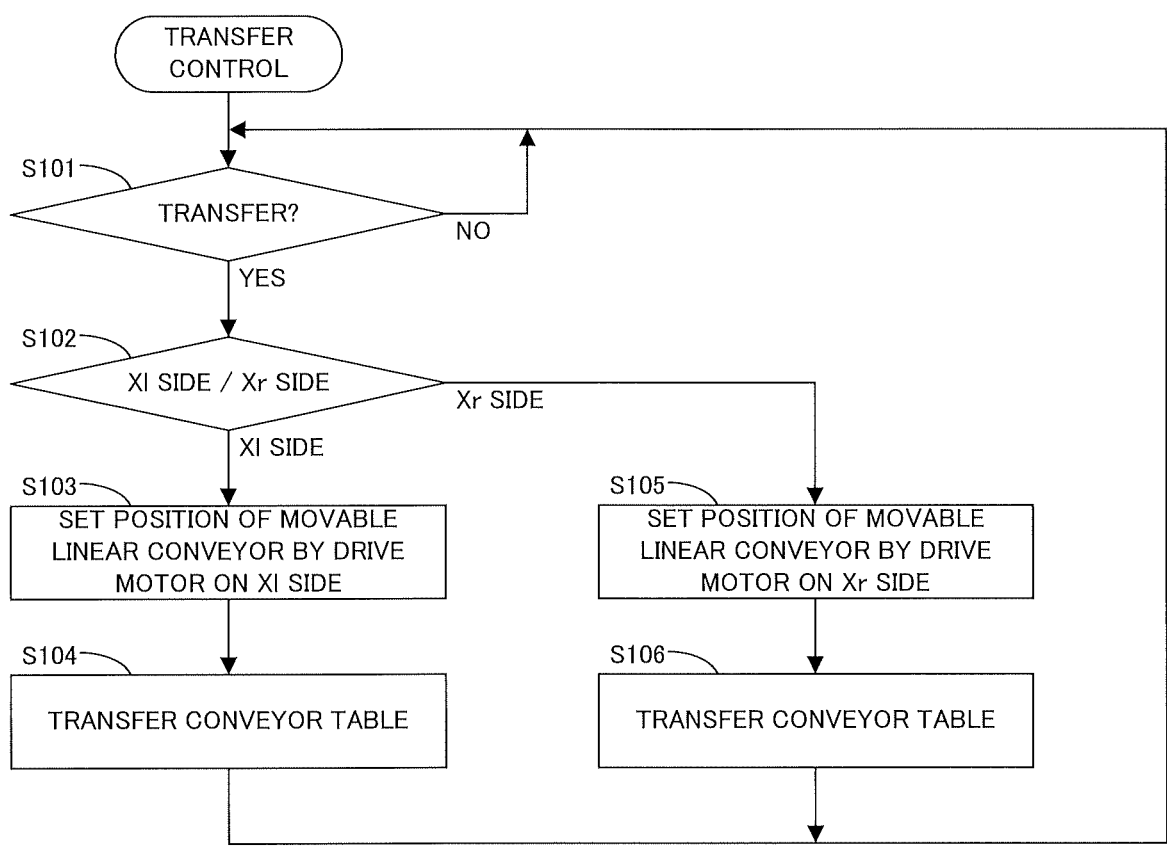

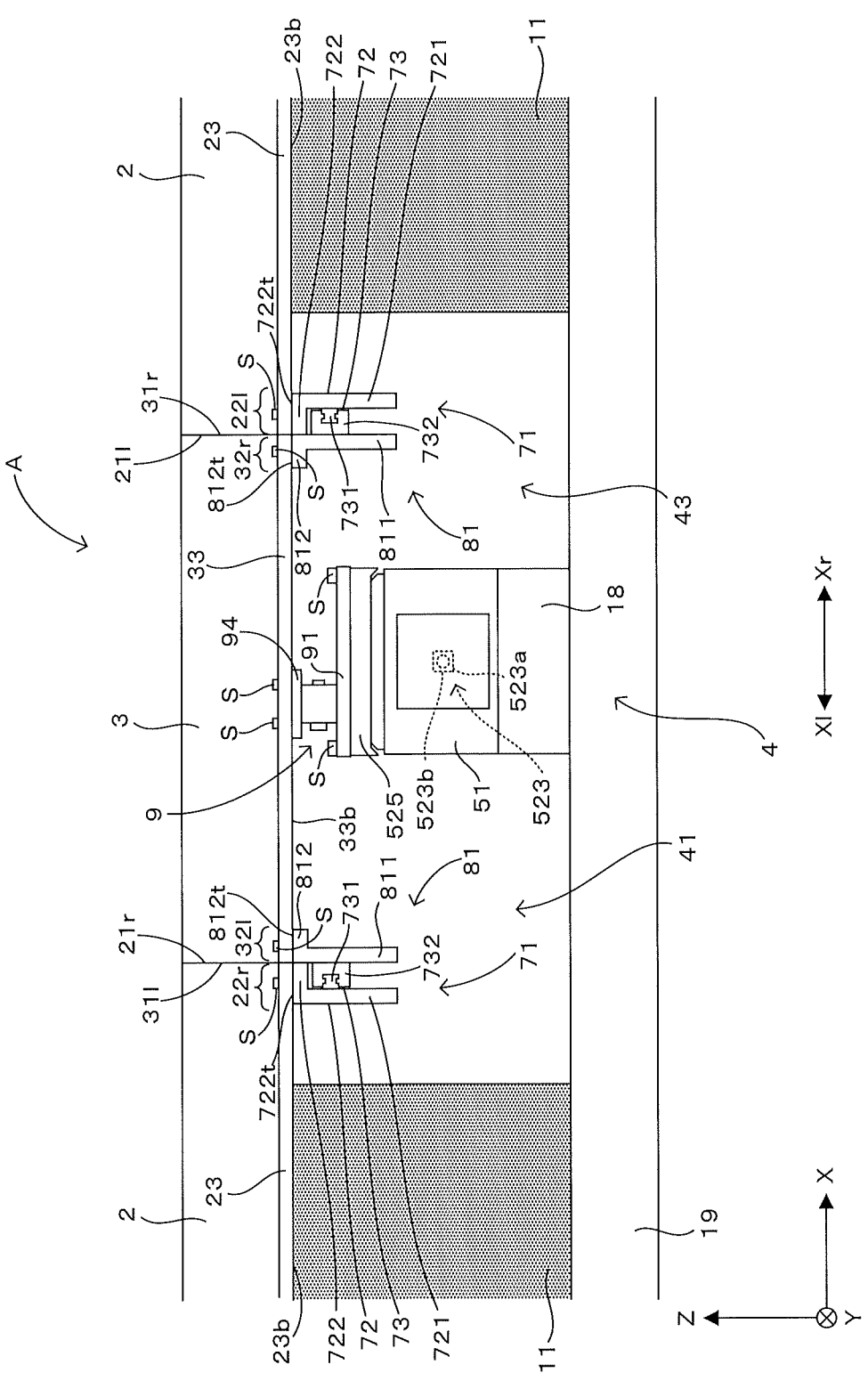
F I G. 8

F I G   9
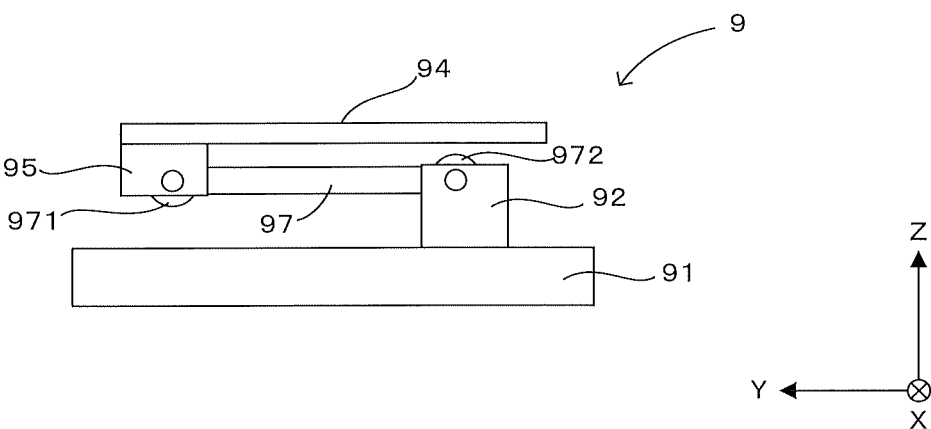

CONVEYANCE PATH SWITCHING APPARATUS, CONVEYANCE SYSTEM, AND CONVEYANCE PATH SWITCHING METHOD

CROSS-REFERENCE TO RELATED APPLICATION

This application is a National Stage of International Patent Application No. PCT/JP2022/007999, filed Feb. 25, 2022, the entire contents of which is incorporated herein by reference.

BACKGROUND

Technical Field

This disclosure relates to a technique for performing switching of a conveyance path of a table conveyor between two fixed linear conveyors arranged on both sides of a movable linear conveyor, by the movable linear conveyor.

Background

WO 2021/229781 discloses a circulation conveyance apparatus for circularly conveying a table conveyor by using a movable linear conveyor which conveys the table conveyor between two fixed linear conveyors arranged in parallel. In the circulation conveyance apparatus, the movable linear conveyor is movable between a position facing one of the two fixed linear conveyors and a position facing the other fixed linear conveyor. This movable linear conveyor transfers the table conveyor to/from the one fixed linear conveyor at the position facing the one fixed linear conveyor and transfers the table conveyor to/from the other fixed linear conveyor at the position facing the other fixed linear conveyor.

SUMMARY

In the above-described circulation conveyance apparatus, both the two fixed linear conveyors each of which transfers a conveyor table to/from the movable linear conveyor are arranged on one side of the movable linear conveyor. Therefore, it is sufficient that the movable linear conveyor can transfer the table conveyor to/from the fixed linear conveyors located on one side of the movable linear conveyor.

In contrast to this, in an apparatus in which two fixed linear conveyors are arranged on both the sides of the movable linear conveyor, respectively, it is necessary for the movable linear conveyor to perform both the transfer of the table conveyor to/from a fixed linear conveyor located on one side of the movable linear conveyor and the transfer of the table conveyor to/from a fixed linear conveyor located on the other side of the movable linear conveyor. For this reason, there are a situation where the table conveyor is positioned at an end portion of the movable linear conveyor on one side thereof and a load on the movable linear conveyor is biased to one side and another situation where the table conveyor is positioned at another end portion of the movable linear conveyor on the other side thereof and the load on the movable linear conveyor is biased to the other side. Therefore, there arises a problem that the transfer of the table conveyor to/from the fixed linear conveyor cannot be appropriately performed since the end portion of the movable linear conveyor on the one side thereof is sunk down when the table conveyor is transferred to/from the fixed linear conveyor on the one side thereof or the end portion of the movable linear conveyor on the other side thereof is sunk down when the table conveyor is transferred to/from the fixed linear conveyor on the other side thereof.

Accordingly, the embodiments of the present disclosure make it possible to appropriately perform transfer of a conveyor table between a movable linear conveyor and each of fixed linear conveyors which are arranged on both sides of the movable linear conveyor by supporting the movable linear conveyor while resisting a bias of a load on the movable linear conveyor.

A conveyance path switching apparatus according to the disclosure, comprises a movable linear conveyor conveying a conveyor table in a predetermined conveyance direction: a first support mechanism supporting a first end portion which is an end portion of the movable linear conveyor on one side in the conveyance direction; and a second support mechanism supporting a second end portion which is an end portion of the movable linear conveyor on other side opposite to the one side in the conveyance direction. The first support mechanism and the second support mechanism support the movable linear conveyor which moves in a switching direction inclined with respect to the conveyance direction within a movable range including a first position and a second position which are different from each other in the switching direction. A first fixed linear conveyor faces the first position from the one side in the conveyance direction. A second fixed linear conveyor faces the second position from the other side in the conveyance direction. The movable linear conveyor transfers the conveyor table to/from the first fixed linear conveyor while stopping at the first position. The movable linear conveyor transfers the conveyor table to/from the second fixed linear conveyor while stopping at the second position. The first support mechanism has a first movable member which is attached to the first end portion of the movable linear conveyor and a first guide part which is attached to the first fixed linear conveyor and guides the first movable member in the switching direction, and the second support mechanism has a second movable member which is attached to the second end portion of the movable linear conveyor and a second guide part which is attached to the second fixed linear conveyor and guides the second movable member in the switching direction.

A conveyance system according to the disclosure, comprises a first fixed linear conveyor driving a conveyor table in a conveyance direction: a second fixed linear conveyor driving the conveyor table in the conveyance direction; and a conveyance path switching apparatus as described above which is arranged between the first fixed linear conveyor and the second fixed linear conveyor in the conveyance direction.

A conveyance path switching method according to the disclosure, comprises moving a movable linear conveyor conveying a conveyor table in a predetermined conveyance direction, in a switching direction inclined with respect to the conveyance direction within a movable range including a first position and a second position which are different from each other in the switching direction. A first end portion which is an end portion of the movable linear conveyor on one side in the conveyance direction is supported by a first support mechanism; and a second end portion which is an end portion of the movable linear conveyor on other side opposite to the one side in the conveyance direction is supported by a second support mechanism. A first fixed linear conveyor faces the first position from the one side in the conveyance direction, and a second fixed linear conveyor faces the second position from the other side in the conveyance direction. The movable linear conveyor transfers the conveyor table to/from the first fixed linear conveyor while stopping at the first position. The movable linear conveyor transfers the conveyor table to/from the second fixed linear conveyor while stopping at the second position. The first support mechanism has a first movable member which is attached to the first end portion of the movable linear conveyor and a first guide part which is attached to the first fixed linear conveyor and guides the first movable member in the switching direction, and the second support mechanism has a second movable member which is attached to the second end portion of the movable linear conveyor and a second guide part which is attached to the second fixed linear conveyor and guides the second movable member in the switching direction.

In the present disclosure (the conveyance path switching apparatus, the conveyance system, and the conveyance path switching method) having such a configuration, provided are a first support mechanism supporting a first end portion which is an end portion of a movable linear conveyor on one side in a conveyance direction and a second support mechanism supporting a second end portion which is an end portion of the movable linear conveyor on the other side opposite to the one side in the conveyance direction. Particularly, the first support mechanism has a first movable member which is attached to the first end portion of the movable linear conveyor and a first guide part which is attached to the first fixed linear conveyor and guides the first movable member in a switching direction. By the first support mechanism having the first movable member and the first guide part, the first end portion of the movable linear conveyor can be firmly supported with respect to the first fixed linear conveyor. Therefore, even when a load on the movable linear conveyor is biased to the first end portion, it is possible to suppress sinking of the first end portion with respect to the first fixed linear conveyor and thereby appropriately perform transfer of the conveyor table between the first fixed linear conveyor and the first end portion. Moreover, the second support mechanism has a second movable member which is attached to the second end portion of the movable linear conveyor and a second guide part which is attached to the second fixed linear conveyor and guides the second movable member in the switching direction. By the second support mechanism having the second movable member and the second guide part, the second end portion of the movable linear conveyor can be firmly supported with respect to the second fixed linear conveyor. Therefore, even when a load on the movable linear conveyor is biased to the second end portion, it is possible to suppress sinking of the second end portion with respect to the second fixed linear conveyor and thereby appropriately perform transfer of the conveyor table between the second fixed linear conveyor and the second end portion. As a result, it becomes possible to appropriately perform the transfer of the conveyor table between the movable linear conveyor and each of the fixed linear conveyors which are arranged on both the sides of the movable linear conveyor, respectively, by supporting the movable linear conveyor against a bias of the load on the movable linear conveyor.

The conveyance path switching apparatus may be configured so that the first guide part has a drive source, and the drive source drives the first movable member in the switching direction to thereby move the movable linear conveyor in the switching direction. In such a configuration, it is possible to move the movable linear conveyor between the first position and the second position in the switching direction by the drive source of the first guide part. Particularly, by providing the drive source in the first guide part, both the functions of driving and guiding the first movable member can be compactly achieved by a single functional part, i.e., the first guide part, and it is therefore possible to ensure reduction in the size of the conveyance path switching apparatus.

The conveyance path switching apparatus may be configured so that the first guide part has a ball screw arranged in parallel with the switching direction. The first movable member is connected to a nut of the ball screw, and the drive source rotates a screw shaft of the ball screw to thereby drive the first movable member in the switching direction. In such a configuration, it is possible to move the movable linear conveyor in the switching direction by the ball screw type single axis robot arranged on one side of the movable linear conveyor.

The conveyance path switching apparatus may be configured so that the first guide part has a first drive source, the second guide part has a second drive source, the first drive source drives the first movable member in the switching direction to thereby move the movable linear conveyor in the switching direction, and the second drive source drives the second movable member in the switching direction to thereby move the movable linear conveyor in the switching direction. In such a configuration, it is possible to move the movable linear conveyor between the first position and the second position in the switching direction by the first drive source of the first guide part and the second drive source of the second guide part. Particularly, by providing the first drive source in the first guide part, both the functions of driving and guiding the first movable member can be compactly achieved by a single functional part, i.e., the first guide part and by providing the second drive source in the second guide part, both the functions of driving and guiding the second movable member can be compactly achieved by a single functional part, i.e., the second guide part, and it is therefore possible to ensure reduction in the size of the conveyance path switching apparatus.

The conveyance path switching may be configured so that the first guide part has a first ball screw arranged in parallel with the switching direction, the first movable member is connected to a nut of the first ball screw, and the first drive source rotates a screw shaft of the first ball screw to thereby drive the first movable member in the switching direction. The second guide part has a second ball screw arranged in parallel with the switching direction, the second movable member is connected to a nut of the second ball screw, and the second drive source rotates a screw shaft of the second ball screw to thereby drive the second movable member in the switching direction. In such a configuration, by the ball screw type single axis robot arranged on one side of the movable linear conveyor and the ball screw type single axis robot arranged on the other side of the fixed linear conveyor, the movable linear conveyor can be moved in the switching direction.

The conveyance path switching may be configured so as to further comprises a control part controlling an operation of the first drive source and an operation of the second drive source. The control part controls a position of the movable linear conveyor at the first position by the operation of the first drive source while stopping the operation of the second drive source when causing the movable linear conveyor and the first fixed linear conveyor to face each other in the conveyance direction. The control part controls a position of the movable linear conveyor at the second position by the operation of the second drive source while stopping the operation of the first drive source when causing the movable linear conveyor and the second fixed linear conveyor to face each other in the conveyance direction. In such a configuration, when causing the first fixed linear conveyor and the movable linear conveyor to face each other in the conveyance direction, it is possible to accurately position the movable linear conveyor with respect to the first fixed linear conveyor by the first drive source while preventing interference of an operation of the second drive source, thereby smoothly transferring the table conveyor. Further, when causing the second fixed linear conveyor and the movable linear conveyor to face each other in the conveyance direction, it is possible to accurately position the movable linear conveyor with respect to the second fixed linear conveyor by the second drive source while preventing interference of an operation of the first drive source, and thereby smoothly transferring the table conveyor. Furthermore, a typical example of the situation where the fixed linear conveyor and the movable linear conveyor face each other in the conveyance direction is a situation where the table conveyor is transferred between the fixed linear conveyor and the movable linear conveyor. Even in a situation where the fixed linear conveyor and the movable linear conveyor are mutually positioned not for the purpose of transferring the table conveyor, however, the above-described control is effective.

The conveyance path switching apparatus may be configured so as to further comprises: a link mechanism mounted on the movable linear conveyor at a mounting position between the first end portion and the second end portion in the conveyance direction; and a single axis robot moving the movable linear conveyor in the switching direction by driving the link mechanism in the switching direction. The link mechanism has a first spherical bearing attached to the movable linear conveyor, a second spherical bearing attached to a slider of the single axis robot, and a rod with which the first spherical bearing and the second spherical bearing are connected to each other, and one end of the rod is received by the first spherical bearing and other end of the rod opposite to the one end is received by the second spherical bearing. In such a configuration, an error in the degree of parallelism between the first and second guide parts and the single axis robot can be absorbed by the degree of freedom of the link mechanism. Therefore, it is possible to smoothly move the movable linear conveyor in the switching direction.

The conveyance path switching apparatus may be configures so that the first movable member has a first support surface facing a bottom surface of the first end portion from below, the first support surface is butted against the bottom surface of the first end portion to thereby position the first movable member and the first end portion, the first guide part has a first mounting surface to be butted against a bottom surface of the first fixed linear conveyor from below, and the first mounting surface is butted against the bottom surface of the first fixed linear conveyor to thereby position the first guide part and the first fixed linear conveyor. The second movable member has a second support surface facing a bottom surface of the second end portion from below, the second support surface is butted against the bottom surface of the second end portion to thereby position the second movable member and the second end portion, the second guide part has a second mounting surface to be butted against a bottom surface of the second fixed linear conveyor from below, and the second mounting surface is butted against the bottom surface of the second fixed linear conveyor to thereby position the second guide part and the second fixed linear conveyor. In such a configuration, by butting the first mounting surface of the conveyance path switching apparatus against the bottom surface of the first fixed linear conveyor and butting the second mounting surface of the conveyance path switching apparatus against the bottom surface of the second fixed linear conveyor, it is possible to easily and conveniently position the first and second fixed linear conveyors and the movable linear conveyor. For this reason, it is possible to reduce operator's load required for an operation of mounting the conveyance path switching apparatus onto the first and second fixed linear conveyors.

The conveyance path switching apparatus may be configured so that the movable range includes a third position different from at least the second position among the first position and the second position, a third fixed linear conveyor faces the third position from the other side in the conveyance direction, the movable linear conveyor transfers the conveyor table to/from the third fixed linear conveyor while stopping at the third position, and the second guide part of the second support mechanism is mounted onto the third fixed linear conveyor. In such a configuration, the second guide part of the second support mechanism is mounted onto the third fixed linear conveyor. By the second support mechanism, the second end portion of the movable linear conveyor can be firmly supported with respect to the third fixed linear conveyor. Therefore, even when a load on the movable linear conveyor is biased to the second end portion, it is possible to suppress sinking of the second end portion with respect to the third fixed linear conveyor and thereby appropriately perform transfer of the conveyor table between the third fixed linear conveyor and the second end portion.

The conveyance path switching apparatus may be configures so that the movable range includes a fourth position different from at least the first position among the first position and the second position, a fourth fixed linear conveyor faces the fourth position from the one side in the conveyance direction, the movable linear conveyor transfers the conveyor table to/from the fourth fixed linear conveyor while stopping at the fourth position, and the first guide part of the first support mechanism is mounted onto the fourth fixed linear conveyor. In such a configuration, the first guide part of the first support mechanism is mounted onto the fourth fixed linear conveyor. By the first support mechanism, the first end portion of the movable linear conveyor can be firmly supported with respect to the fourth fixed linear conveyor. Therefore, even when a load on the movable linear conveyor is biased to the first end portion, it is possible to suppress sinking of the first end portion with respect to the fourth fixed linear conveyor and thereby appropriately perform transfer of the conveyor table between the fourth fixed linear conveyor and the first end portion.

The conveyance path switching apparatus may be configures so as to further comprises: a first mounting member mounting the first support mechanism onto a first mounting frame on which the first fixed linear conveyor is mounted, and a second mounting member mounting the second support mechanism onto a second mounting frame on which the second fixed linear conveyor is mounted. In such a configuration, by supporting the first and second support mechanisms by the first and second mounting members, respectively, it is possible to reduce a load to be added to the first and second fixed linear conveyors.

According to the present disclosure, it becomes possible to appropriately perform the transfer of the conveyor table between the movable linear conveyor and each of the fixed linear conveyors which are arranged on both the sides of the movable linear conveyor, respectively, by supporting the movable linear conveyor against the bias of the load on the movable linear conveyor.

BRIEF DESCRIPTION OF THE DRAWINGS

FIG. 1D is a plan view schematically showing the configuration and operation of the conveyance system in accordance with the disclosure;

FIG. 3 is an elevational view schematically showing a first example of a branch conveyance apparatus included in the substrate conveyance system;

FIG. 4 is a side elevational view schematically showing a support mechanism for supporting a movable linear conveyor by using a single axis robot;

FIG. 5 is a side elevational view schematically showing a support mechanism for supporting the movable linear conveyor by using a slide guide;

FIG. 6 is an elevational view schematically showing a second example of the branch conveyance apparatus included in the substrate conveyance system;

FIG. 7 is a flowchart showing an exemplary transfer control in the branch conveyance apparatus including two single axis robots;

FIG. 8 is an elevational view schematically showing a third example of the branch conveyance apparatus included in the substrate conveyance system; and FIG. 9 is a side elevational view schematically showing an exemplary link mechanism included in the branch conveyance apparatus shown in FIG. 8.

DETAILED DESCRIPTION

Figure 1A:
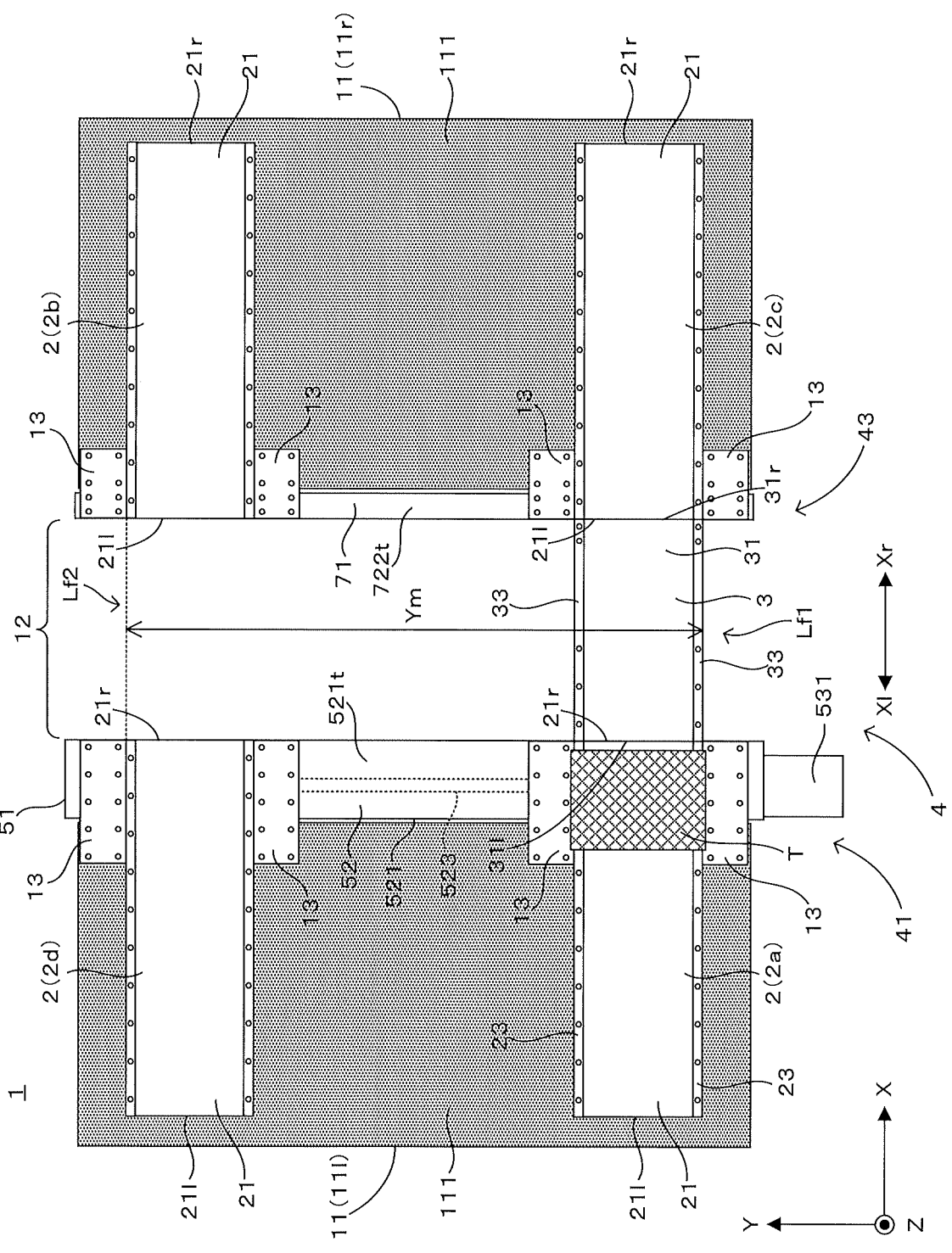
FIG. 1A is a plan view schematically showing configuration and operation of a conveyance system in accordance with the disclosure.
Figure 1B:
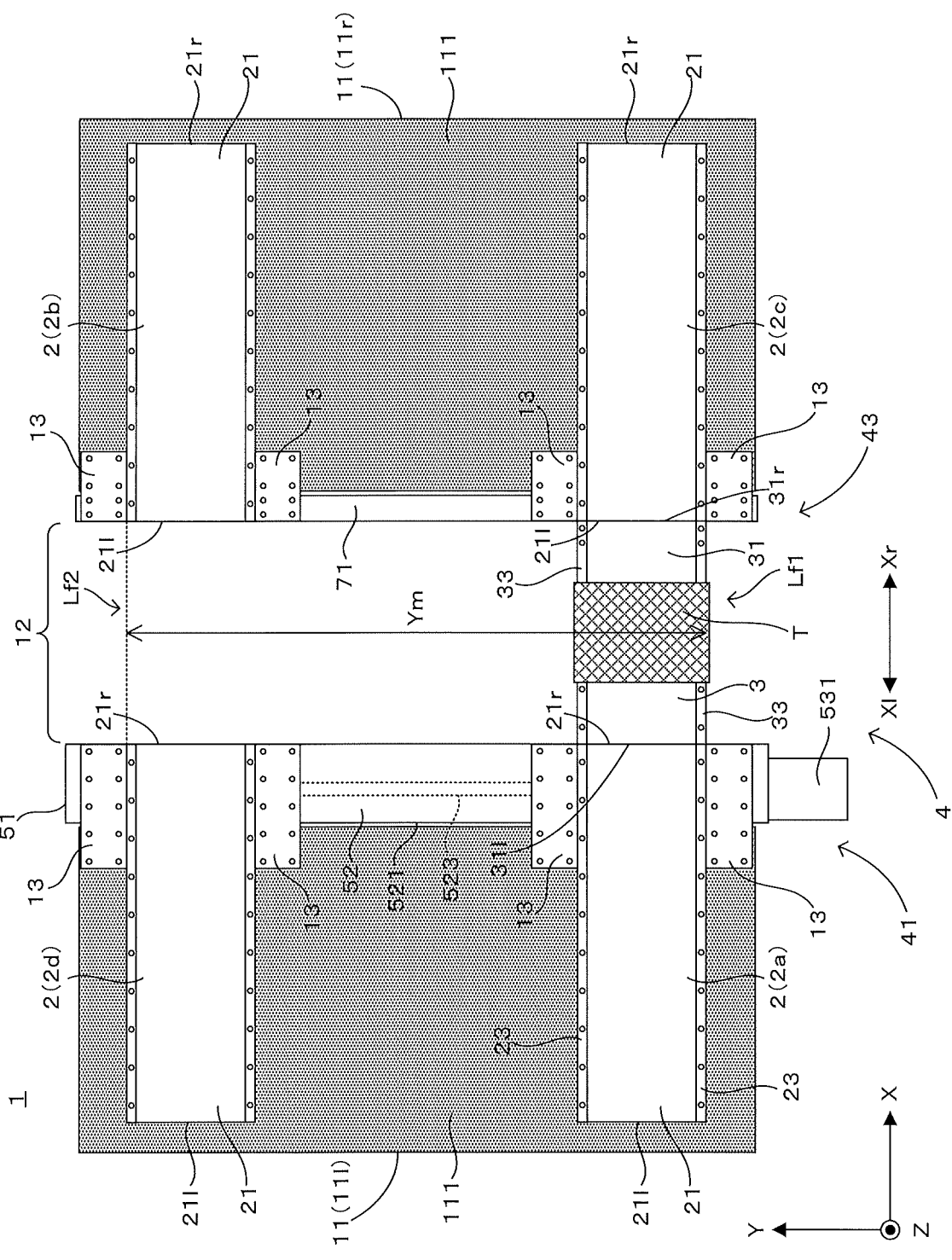
FIG. 1B is a plan view schematically showing the configuration and operation of the conveyance system in accordance with the disclosure.
Figure 1C:
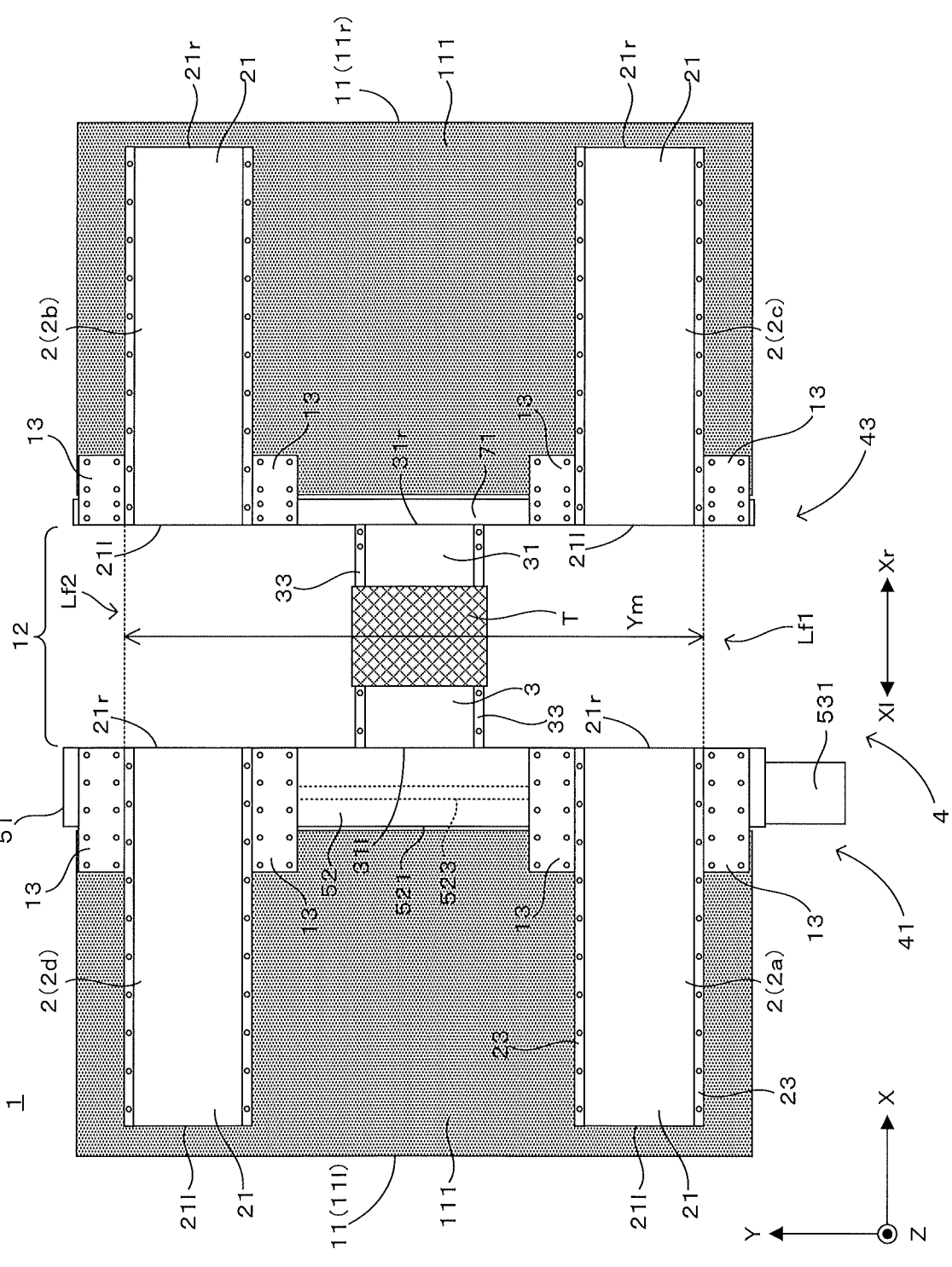
FIG. 1C is a plan view schematically showing the configuration and operation of the conveyance system in accordance with the disclosure.
Figure 1E:
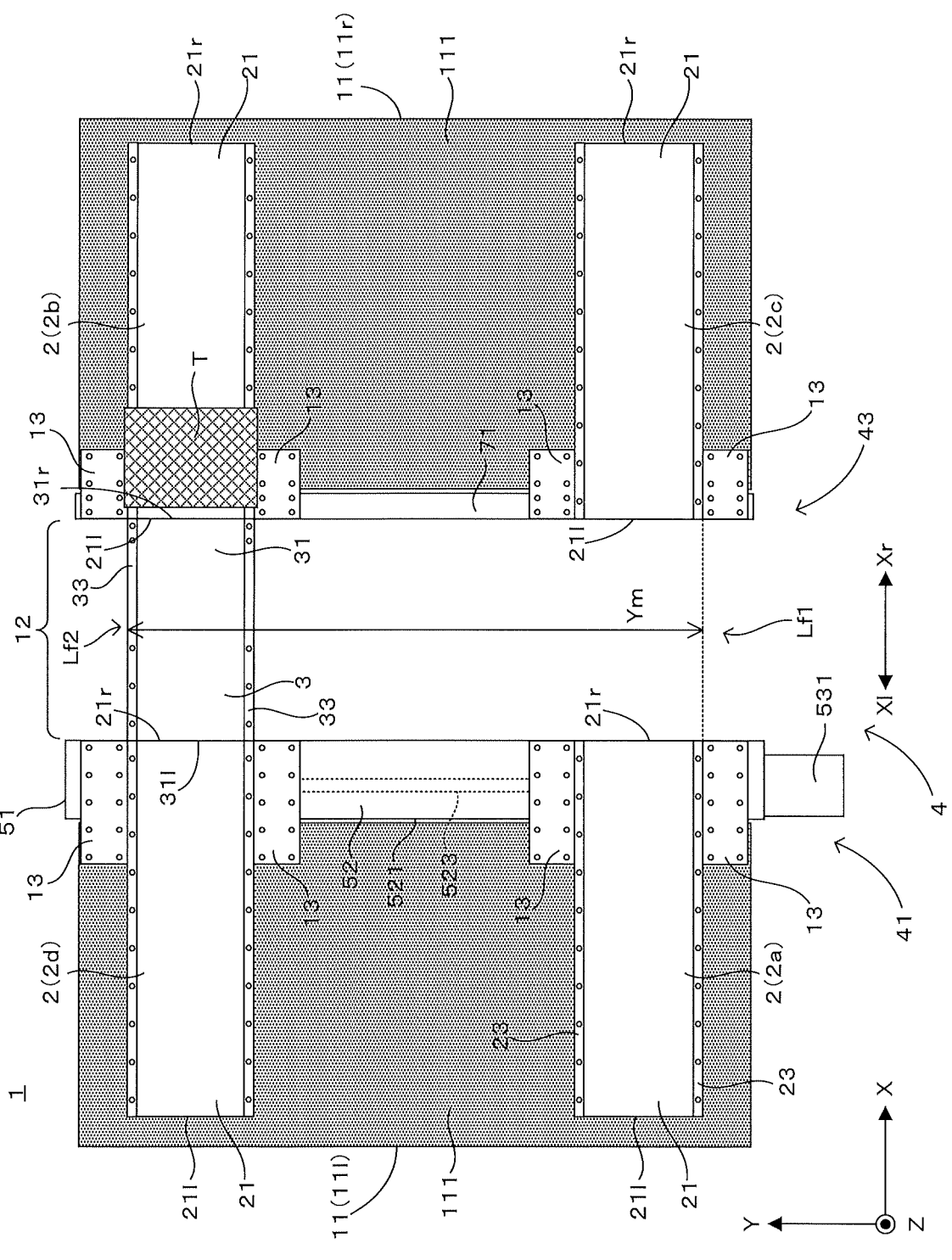
FIG. 1E is a plan view schematically showing the configuration and operation of the conveyance system in accordance with the disclosure.
Figure 2:
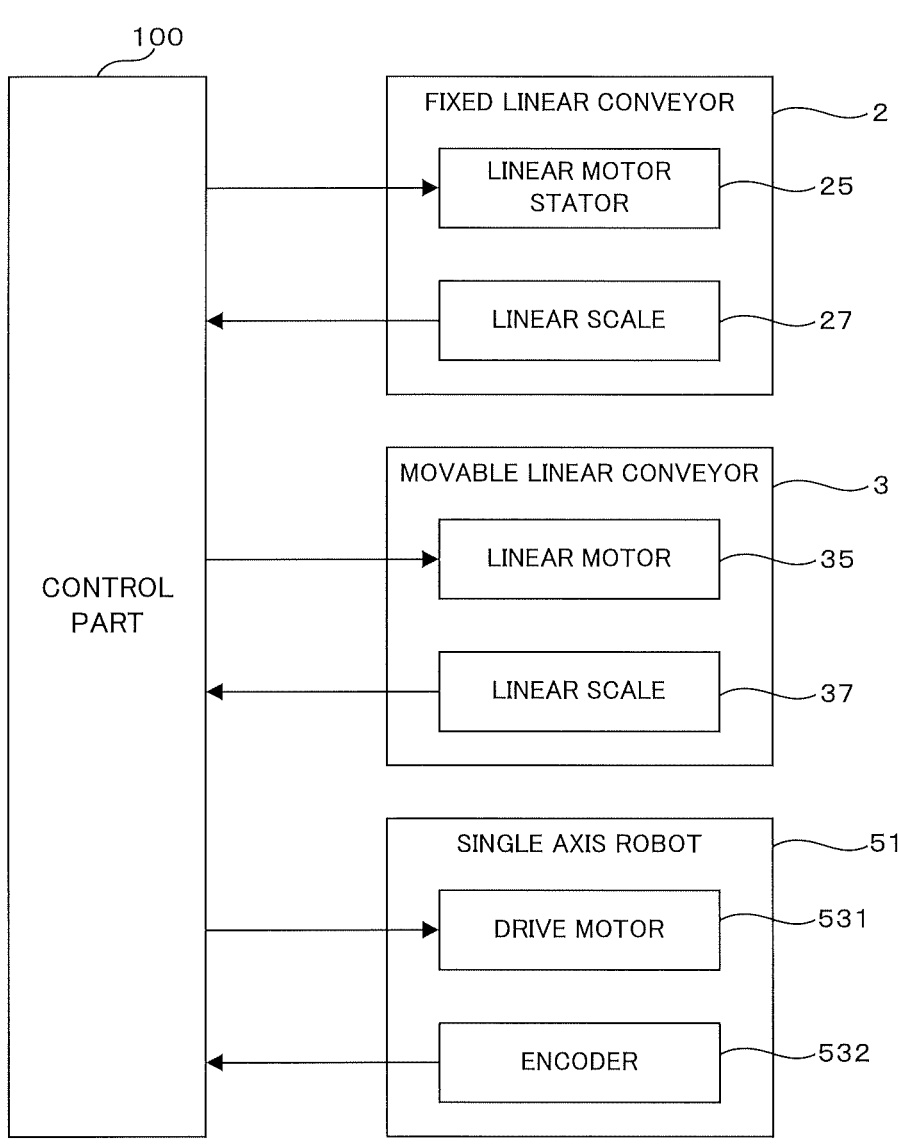
FIG. 2 is a block diagram showing an electrical configuration included in the substrate conveyance system shown in FIGS. 1A to 1E.

FIGS. 1A to 1E are plan views each schematically showing configuration and operation of a conveyance system in accordance with the present disclosure. FIG. 2 is a block diagram showing an electrical configuration included in the substrate conveyance system shown in FIGS. 1A to 1E. In the drawings of the present specification, an X direction which is a horizontal direction, a Y direction which is a horizontal direction orthogonal to the X direction, and a Z direction which is a vertical direction are shown as appropriate, and an Xl side (the left side in the paper of FIGS. 1A to 1E) and an Xr side (the right side in the paper of FIGS. 1A to 1E) which are opposite to each other in the X direction are shown as appropriate.

As shown in FIGS. 1A to 1E, a conveyance system 1 includes two mounting frames 11 and four fixed linear conveyors 2. Further, for distinguishing the two mounting frames 11, the two mounting frames 11 are referred to as mounting frames 11*l* and 11*r* as appropriate, and for distinguishing the four fixed linear conveyors 2, the four fixed linear conveyors 2 are referred to as fixed linear conveyors 2*a*, 2*b*, 2*c*, and 2*d* as appropriate. Furthermore, in FIG. 2, one fixed linear conveyor 2 is shown on behalf of the four fixed linear conveyors 2.

The two mounting frames 11*l* and 11*r* are arranged in the X direction with an interval 12 therebetween and each have a rectangle consisting of two sides in parallel with the X direction and two sides in parallel with the Y direction in a plan view. Among the four fixed linear conveyors 2, the two fixed linear conveyors 2*a* and 2*d* are arranged on an upper surface 11*l* of the mounting frame 11*l* on the Xl side and the two fixed linear conveyors 2*b* and 2*c* are arranged on an upper surface 11*l* of the mounting frame 11*r* on the Xr side. Each of the respective upper surfaces 11*l* of the mounting frames 11*l* and 11*r* is a horizontal plane orthogonal to the Z direction.

Each of the four fixed linear conveyors 2 is arranged in parallel with the X direction. Particularly, the two fixed linear conveyors 2*a* and 2*d* on the mounting frame 11*l* are arranged in parallel with each other in the X direction, and the two fixed linear conveyors 2*b* and 2*c* on the mounting frame 11*r* are arranged in parallel with each other in the X direction. Further, the fixed linear conveyor 2*a* on the mounting frame 11*l* and the fixed linear conveyor 2*c* on the mounting frame 11*r* are arranged in series in the X direction and the fixed linear conveyor 2*d* on the mounting frame 11*l* and the fixed linear conveyor 2*b* on the mounting frame 11*r* are arranged in series in the X direction. Then, the conveyance system 1 can convey a table conveyor T among these fixed linear conveyors 2*a*, 2*b*, 2*c*, and 2*d*.

The fixed linear conveyor 2 includes a linear housing 21 extending in the X direction, and the linear housing 21 has a rectangle consisting of two sides in parallel with the X direction and two sides in parallel with the Y direction in a plan view. This linear housing 21 has flanges 23 protruding to both sides of the Y direction, and by fastening the flange 23 onto the upper surface 11*l* of the mounting frame 11 with screws, the fixed linear conveyor 2 is fixed onto the upper surface 11*l* of the mounting frame 11. Further, an end surface 21*l* of the linear housing 21 on the Xl side and an end surface 21*r* of the linear housing 21 on the Xr side stand perpendicular to the X direction.

The table conveyor T can engage with or disengage from the linear housing 21 from the X direction. Specifically, the table conveyor T enters the end surface 21*l* from the Xl side of the linear housing 21 to thereby engage with an upper portion of the linear housing 21 or the table conveyor T enters the end surface 21*r* from the Xr side of the linear housing 21 to thereby engage with the upper portion of the linear housing 21. The table conveyor T thus engaging with the linear housing 21 is guided in the X direction by the linear housing 21. Further, the table conveyor T engaging with the linear housing 21 goes out from the end surface 21*l* to the Xl side to thereby disengage from the upper portion of the linear housing 21 or the table conveyor T engaging with the linear housing 21 goes out from the end surface 21*r* to the Xr side to thereby disengage from the upper portion of the linear housing 21.

Moreover, the fixed linear conveyor 2 has a linear motor stator 25 arranged inside the linear housing 21 and a linear scale 27 (FIG. 2). The linear motor stator 25 has a coil which generates a magnetic field in accordance with an applied current. In contrast to this, the table conveyor T has a permanent magnet which is a mover and the linear motor stator 25 drives the table conveyor T in the X direction by a magnetic force generated between the linear motor stator 25 and the mover of the table conveyor T engaging with the linear housing 21. Further, the linear scale 27 detects a position (X coordinate) of the table conveyor T in the X direction.

The movable linear conveyor 3 is disposed in the interval 12 between the mounting frame 11*l* and the mounting frame 11*r* in the X direction in a plan view. The movable linear conveyor 3 includes a linear housing 31 extending in the X direction, and the linear housing 31 has a rectangle consisting of two sides in parallel with the X direction and two sides in parallel with the Y direction in a plan view. This linear housing 31 has flanges 33 protruding to both sides of the Y direction. Further, an end surface 311 of the linear housing 31 on the Xl side and an end surface 31*r* of the linear housing 31 on the Xr side stand perpendicular to the X direction.

The table conveyor T can engage with or disengage from the linear housing 31 from the X direction. Specifically, the table conveyor T enters the end surface 311 from the Xl side of the linear housing 31 to thereby engage with an upper portion of the linear housing 31 or the table conveyor T enters the end surface 31*r* from the Xr side of the linear housing 31 to thereby engage with the upper portion of the linear housing 31. The table conveyor T thus engaging with the linear housing 31 is guided in the X direction by the linear housing 31. Further, the table conveyor T engaging with the linear housing 31 goes out from the end surface 311 to the Xl side to thereby disengage from the upper portion of the linear housing 31 or the table conveyor T engaging with the linear housing 31 goes out from the end surface 31*r* to the Xr side to thereby disengage from the upper portion of the linear housing 31.

Moreover, the movable linear conveyor 3 has a linear motor stator 35 arranged inside the linear housing 31 and a linear scale 37 (FIG. 2). The linear motor stator 35 has a coil which generates a magnetic field in accordance with an applied current. This linear motor stator 35 drives the table conveyor T in the X direction by a magnetic force generated between the linear motor stator 35 and the mover of the table conveyor T engaging with the linear housing 31. Further, the linear scale 37 detects a position (X coordinate) of the table conveyor T in the X direction.

In the interval 12 in which the movable linear conveyor 3 is disposed, a movable range Ym of the movable linear conveyor 3 is provided extending in parallel with the Y direction. The conveyance system 1 includes a conveyor moving unit 4 provided for the movable range Ym, and the conveyor moving unit 4 moves the movable linear conveyor 3 in the Y direction within the movable range Ym. This conveyor moving unit 4 has a support mechanism 41 arranged on the Xl side of the movable range Ym and a support mechanism 43 arranged on the Xr side of the movable range Ym.

The support mechanism 41 has a single axis robot 51 arranged in parallel with the Y direction. The single axis robot 51 has a robot body 52 extending in the Y direction. The robot body 52 has a robot housing 521 extending in the Y direction and a ball screw 523 arranged in parallel with the Y direction inside the robot housing 521. This robot housing 521 is fixed onto the upper surface 11*l* of the mounting frame 11*l* via a fixing plate 13. Specifically, the fixing plate 13 is disposed from above, spanning the upper surface 11*l* of the mounting frame 11 and an upper surface 521*t* of the robot housing 521 of the single axis robot 51 in the X direction. Then, an end portion of the fixing plate 13 on the Xl side is fastened and fixed to the upper surface 11*l* of the mounting frame 11 with screws (fastening members) and an end portion of the fixing plate 13 on the Xr side is fastened and fixed to the upper surface 521*t* of the robot housing 521 of the single axis robot 51 with screws (fastening members). Particularly, a pair of fixing plates 13 are arranged for each of the fixed linear conveyors 2*a* and 2*d* so that the pair of fixing plates 13 can sandwich the fixed linear conveyor 2 from the Y direction. Further, the robot housing 521 is fixed to each of the fixed linear conveyors 2*a* and 2*d* as described later. Furthermore, the single axis robot 51 has a drive motor 531 attached to one end of the robot body 52 in the Y direction and an encoder 532 (FIG. 2) for detecting a rotation position of the drive motor 531, and the drive motor 531 is connected to the ball screw 523. A nut of the ball screw 523 of the single axis robot 51 is connected to an end portion of the movable linear conveyor 3 on the Xl side, and when the drive motor 531 rotates a screw shaft of the ball screw 523, the movable linear conveyor 3 is moved in the Y direction.

Further, the support mechanism 43 has a Y-axis conveyor guide 71 extending in parallel with the Y direction. The Y-axis conveyor guide 71 is fixed to the upper surface 11*l* of the mounting frame 11*r* via the fixing plate 13. Specifically, the fixing plate 13 is disposed from above, spanning the upper surface 11*l* of the mounting frame 11 and an upper surface 722*t* of the Y-axis conveyor guide 71 in the X direction. Then, an end portion of the fixing plate 13 on the Xr side is fastened and fixed to the upper surface 11*l* of the mounting frame 11 with screws (fastening members) and an end portion of the fixing plate 13 on the Xl side is fastened and fixed to the upper surface 722*t* of the Y-axis conveyor guide 71 with screws (fastening members). Particularly, a pair of fixing plates 13 are arranged for each of the fixed linear conveyors 2*b* and 2*c* so that the pair of fixing plates 13 can sandwich the fixed linear conveyor 2 from the Y direction. Further, the Y-axis conveyor guide 71 is fixed to each of the fixed linear conveyors 2*b* and 2*c* as described later. The Y-axis conveyor guide 71 is connected to the end portion of the movable linear conveyor 3 on the Xr side, and guides the movable linear conveyor 3, which is moving by a driving force of the drive motor 531, in the Y direction.

Further, the conveyance system 1 has a control part 100 (FIG. 2) configured to control the four fixed linear conveyors 2, the movable linear conveyor 3, and the single axis robot 51. The control part 100 is formed from a processor such as a CPU (Central Processing Unit) or an FPGA (Field Programmable Gate Array) or the like. The control part 100 performs a feedback control on each fixed linear conveyor 2, for controlling a position of the table conveyor T by adjusting a current to be applied to the linear motor stator 25 on the basis of the position of the table conveyor T detected by the linear scale 27. Further, the control part 100 performs a feedback control on the movable linear conveyor 3, for controlling a position of the table conveyor T in the X direction by adjusting a current to be applied to the linear motor stator 35 on the basis of the position of the table conveyor T detected by the linear scale 37. Furthermore, the control part 100 performs a feedback control on the single axis robot 51, for controlling a position of the table conveyor T in the Y direction by adjusting a rotation position of the drive motor 531 on the basis of the rotation position of the drive motor 531 detected by the encoder 532, in other words, the position (Y coordinate) of the movable linear conveyor 3 in the Y direction.

In the conveyance system 1, the movable linear conveyor 3 is movable in the Y direction within the movable range Ym and can be positioned at any one of a plurality of facing positions Lf1 and Lf2 included in the movable range Ym.

Herein, the facing positions Lf1 and Lf2 are positions different from each other in the Y direction, and the facing position Lf1 faces the fixed linear conveyors 2a and 2c in the X direction and the facing position Lf2 faces the fixed linear conveyors 2b and 2d in the X direction. Specifically, the movable linear conveyor 3 positioned at the facing position Lf1 faces an end surface 21r of the fixed linear conveyor 2a on the Xr side from the Xr side and faces an end surface 21l of the fixed linear conveyor 2c on the Xl side from the Xl side. Further, the movable linear conveyor 3 positioned at the facing position Lf2 faces an end surface 21r of the fixed linear conveyor 2d on the Xr side from the Xr side and faces an end surface 21l of the fixed linear conveyor 2b on the Xl side from the Xl side.

Furthermore, the support mechanism 41 supports the movable linear conveyor 3 to the fixed linear conveyor 2a so that there is an interval (clearance) between an end surface 311 of the movable linear conveyor 3 positioned at the facing position Lf1 and the end surface 21r of the fixed linear conveyor 2a. Further, the support mechanism 43 supports the movable linear conveyor 3 to the fixed linear conveyor 2c so that there is an interval (clearance) between an end surface 31r of the movable linear conveyor 3 positioned at the facing position Lf1 and the end surface 21l of the fixed linear conveyor 2c. Similarly, the support mechanism 41 supports the movable linear conveyor 3 to the fixed linear conveyor 2d so that there is an interval (clearance) between the end surface 311 of the movable linear conveyor 3 positioned at the facing position Lf2 and the end surface 21r of the fixed linear conveyor 2d. Further, the support mechanism 43 supports the movable linear conveyor 3 to the fixed linear conveyor 2b so that there is an interval (clearance) between the end surface 31r of the movable linear conveyor 3 positioned at the facing position Lf2 and the end surface 21l of the fixed linear conveyor 2b.

Therefore, the control part 100 controls the fixed linear conveyor 2a and the movable linear conveyor 3 while controlling the single axis robot 51 to position the movable linear conveyor 3 at the facing position Lf1, to thereby transfer the table conveyor T between the fixed linear conveyor 2a and the movable linear conveyor 3. Further, the control part 100 controls the fixed linear conveyor 2c and the movable linear conveyor 3 while controlling the single axis robot 51 to position the movable linear conveyor 3 at the facing position Lf1, to thereby transfer the table conveyor T between the fixed linear conveyor 2c and the movable linear conveyor 3.

Alternatively, the control part 100 controls the fixed linear conveyor 2d and the movable linear conveyor 3 while controlling the single axis robot 51 to position the movable linear conveyor 3 at the facing position Lf2, to thereby transfer the table conveyor T between the fixed linear conveyor 2d and the movable linear conveyor 3. Further, the control part 100 controls the fixed linear conveyor 2b and the movable linear conveyor 3 while controlling the single axis robot 51 to position the movable linear conveyor 3 at the facing position Lf2, to thereby transfer the table conveyor T between the fixed linear conveyor 2b and the movable linear conveyor 3.

Herein, the transfer of the table conveyor T between the fixed linear conveyor 2 and the movable linear conveyor 3 includes both the move of the table conveyor T from the fixed linear conveyor 2 to the movable linear conveyor 3 and the move of the table conveyor T from the movable linear conveyor 3 to the fixed linear conveyor 2.

The control part 100 can convey the table conveyor T in various manners, and particularly can perform such branch conveyance as described next. In FIG. 1A, for example, the table conveyor T engages with the fixed linear conveyor 2a. In contrast to this, in the conveyance system 1, the two fixed linear conveyors 2b and 2c are arranged in parallel on the Xr side of the fixed linear conveyor 2a with which the table conveyor T engages. Therefore, for conveying this table conveyor T from the fixed linear conveyor 2a toward the Xr side, each of the fixed linear conveyors 2b and 2c can be used as a conveyance destination. Specifically, a conveyance path is branched to any one of these fixed linear conveyors 2b and 2c to convey the table conveyor T (branch conveyance). Further, such branch conveyance can be performed between the fixed linear conveyor 2b (conveyance source) and the fixed linear conveyor 2a or 2d (conveyance destination), between the fixed linear conveyor 2c (conveyance source) and the fixed linear conveyor 2a or 2d (conveyance destination), or between the fixed linear conveyor 2d (conveyance source) and the fixed linear conveyor 2b or 2c (conveyance destination).

Herein, with reference to FIGS. 1A to 1E, an example of the branch conveyance of the table conveyor T from the fixed linear conveyor 2a to the fixed linear conveyor 2b will be described. In FIG. 1A, the movable linear conveyor 3 is stopped at the facing position Lf1 facing the fixed linear conveyor 2a with which the table conveyor T engages. In FIGS. 1A to 1B, the table conveyor T is transferred from the fixed linear conveyor 2a to the movable linear conveyor 3. After the transfer of the table conveyor T to the movable linear conveyor 3 is completed, the movable linear conveyor 3 is moved from the facing position Lf1 toward the facing position Lf2 in the Y direction (FIG. 1C). When the movable linear conveyor 3 reaches the facing position Lf2 facing the fixed linear conveyor 2b, the movable linear conveyor 3 is stopped at the facing position Lf2 (FIG. 1D). Then, in FIGS. 1D to 1E, the table conveyor T is transferred from the movable linear conveyor 3 to the fixed linear conveyor 2b.

FIG. 3 is an elevational view schematically showing a first example of the branch conveyance apparatus included in the substrate conveyance system. This branch conveyance apparatus A includes the above-described movable linear conveyor 3 and the conveyor moving unit 4. FIG. 3 shows a base plate 19 to be placed on an installation surface of the conveyance system 1, the mounting frame 11 placed on the base plate 19, the fixed linear conveyor 2 mounted on the mounting frame 11, and the branch conveyance apparatus A. The conveyor moving unit 4 of the branch conveyance apparatus A has the support mechanism 41 and the support mechanism 43 as described above. Among these, the support mechanism 41 uses the single axis robot 51 to move the movable linear conveyor 3 in the Y direction, and the support mechanism 43 uses the Y-axis conveyor guide 71 to guide the movable linear conveyor 3 in the Y direction.

FIG. 4 is a side elevational view schematically showing the support mechanism for supporting the movable linear conveyor by the single axis robot. The support mechanism 41 shown in FIG. 4 has the single axis robot 51 arranged in parallel with the Y direction, and the single axis robot 51 has the robot body 52 extending in the Y direction and the drive motor 531 attached to one end of the robot body 52 in the Y direction. This robot body 52 has the robot housing 521, the ball screw 523 to be housed inside the robot housing 521, and a slider 525 (FIG. 3) arranged on the Xr side of the robot housing 521. The ball screw 523 has a screw shaft 523a extending in parallel with the Y direction and a nut 523b to be screwed together with the screw shaft 523a, and the drive motor 531 is connected to the screw shaft 523a and the slider 525 is connected to the nut 523b with a connecting member (not shown). Therefore, when the drive motor 531 rotates the screw shaft 523a, the nut 523b is moved in the Y direction and the slider 525 is moved in the Y direction, accompanying the nut 523b. Thus, the single axis robot 51 transmits a driving force of the drive motor 531 to the slider 525 with the ball screw 523, to thereby add the driving force of the drive motor 531 to the slider 525 while guiding the slider 525 in the Y direction which is an extending direction of the ball screw 523. The slider 525 is thereby moved in the Y direction.

The upper surface 521t of the robot housing 521 is butted against a bottom surface 23b of the flange 23 of the fixed linear conveyor 2 from below, and by bringing the upper surface 521t and the bottom surface 23b into contact with each other, the robot housing 521 is positioned with respect to the fixed linear conveyor 2. Particularly, as shown in FIG. 3, the end portion 22r on the Xr side of the fixed linear conveyor 2 on the Xl side protrudes to the Xr side from the mounting frame 11 on which the fixed linear conveyor 2 is mounted. In contrast to this, the robot housing 521 of the single axis robot 51 faces the end portion 22r of the fixed linear conveyor 2 from below and overlaps the end portion 22r in a plan view. Then, at the end portion 22r of the fixed linear conveyor 2, the flange 23 of the fixed linear conveyor 2 and the upper surface 521t of the robot housing 521 are fastened and fixed to each other with screws S (fastening members).

Further, as shown in FIG. 4, in the Y direction, the robot housing 521 of the single axis robot 51 is longer than the movable range Ym so as to include the movable range Ym, and the two fixed linear conveyors 2a and 2d are positioned between both the ends of the robot housing 521. Then, the upper surface 521t of the robot housing 521 is fastened and fixed to the flange 23 of each of the two fixed linear conveyors 2a and 2d with screws S.

Further, the support mechanism 41 has a conveyor support member 61 arranged on the Xr side of the slider 525. The conveyor support member 61 has a standing plate 611 standing in the Z direction so as to be orthogonal to the X direction, a horizontal plate 612 provided horizontally on an upper end of the standing plate 611, and a brace 613 provided between the standing plate 611 and the horizontal plate 612. The standing plate 611 comes into contact with the slider 525 from the Xr side and is fastened and fixed to the slider 525 with screws S.

An upper surface 612t of the horizontal plate 612 is butted against a bottom surface 33b of the flange 33 of the movable linear conveyor 3 from below, and by bringing the upper surface 612t and the bottom surface 33b into contact with each other, the conveyor support member 61 is positioned with respect to the movable linear conveyor 3. Then, the flange 33 of the movable linear conveyor 3 and the upper surface 612t of the horizontal plate 612 of the conveyor support member 61 are fastened and fixed to each other with screws S (fastening members).

Thus, the single axis robot 51 mounted on the fixed linear conveyor 2 supports the conveyor support member 61 mounted on the movable linear conveyor 3 in the Z direction. In other words, the support mechanism 41 having the single axis robot 51 and the conveyor support member 61 performs a function of supporting the movable linear conveyor 3 to the fixed linear conveyor 2.

Further, the single axis robot 51 mounted on the fixed linear conveyor 2 drives and guides the conveyor support member 61 mounted on the movable linear conveyor 3 in the Y direction. In other words, the support mechanism 41 having the single axis robot 51 and the conveyor support member 61 performs of functions of driving the movable linear conveyor 3 with respect to the fixed linear conveyor 2 in the Y direction and guiding the move of the movable linear conveyor 3 with respect to the fixed linear conveyor 2 in the Y direction.

FIG. 5 is a side elevational view schematically showing a support mechanism for supporting the movable linear conveyor by a slide guide. The support mechanism 43 shown in FIG. 5 has the Y-axis conveyor guide 71, and the Y-axis conveyor guide 71 has a base frame 72 extending in the Y direction and a slide guide 73 extending in the Y direction.

The base frame 72 has a standing plate 721 standing in the Z direction so as to be orthogonal to the X direction and a horizontal plate 722 provided horizontally on an upper end of the standing plate 721, and the slide guide 73 is fixed to a side surface of the standing plate 721 on the Xl side. The slide guide 73 has a Y-axis guide rail 731 extending in parallel with the Y direction, and the Y-axis guide rail 731 is fixed to the horizontal plate 722 of the base frame 72. Further, the slide guide 73 has a slider 732 engaging with the Y-axis guide rail 731, and the slider 732 is moved in the Y direction along the Y-axis guide rail 731.

An upper surface 722t of the horizontal plate 722 is butted against the bottom surface 23b of the flange 23 of the fixed linear conveyor 2 from below, and by bringing the upper surface 722t and the bottom surface 23b into contact with each other, the Y-axis conveyor guide 71 is positioned with respect to the fixed linear conveyor 2. Particularly, as shown in FIG. 3, the end portion 221 on the Xl side of the fixed linear conveyor 2 on the Xr side protrudes to the Xl side from the mounting frame 11 on which the fixed linear conveyor 2 is mounted. In contrast to this, the base frame 72 of the Y-axis conveyor guide 71 faces the end portion 221 of the fixed linear conveyor 2 from below and overlaps the end portion 221 in a plan view. Then, at the end portion 221 of the fixed linear conveyor 2, the flange 23 of the fixed linear conveyor 2 and the upper surface 722t of the horizontal plate 722 are fastened and fixed to each other with screws S (fastening members).

Further, as shown in FIG. 5, in the Y direction, the Y-axis guide rail 731 is longer than the movable range Ym so as to include the movable range Ym and the base frame 72 supporting the Y-axis guide rail 731 is also longer than the movable range Ym so as to include the movable range Ym. In contrast to this, the two fixed linear conveyors 2b and 2c are positioned between both the ends of the base frame 72. Then, the upper surface 722t of the horizontal plate 722 of the base frame 72 is fastened and fixed to the flange 23 of each of the two fixed linear conveyors 2b and 2c with screws S.

Furthermore, the support mechanism 43 has a conveyor support member 81 arranged on the Xl side of the slider 732. The conveyor support member 81 has a standing plate 811 standing in the Z direction so as to be orthogonal to the X direction and a horizontal plate 812 provided horizontally on an upper end of the standing plate 811. The standing plate 811 is fixed to a side surface of the slider 732 on the Xl side. Therefore, the conveyor support member 81 is guided in the Y direction by the slider 732 moving along the Y-axis guide rail 731 and also supported by the Y-axis conveyor guide 71 against the gravity in the Z direction.

An upper surface 812t of the horizontal plate 812 of the conveyor support member 81 is butted against the bottom surface 33b of the flange 33 of the movable linear conveyor 3 from below, and by bringing the upper surface 812t and the bottom surface 33b into contact with each other, the conveyor support member 81 is positioned with respect to the movable linear conveyor 3. Then, the flange 33 of the movable linear conveyor 3 and the upper surface 812t of the horizontal plate 812 of the conveyor support member 81 are fastened and fixed to each other with screws S (fastening members).

Thus, the Y-axis conveyor guide 71 mounted on the fixed linear conveyor 2 supports the conveyor support member 81 mounted on the movable linear conveyor 3 in the Z direction. In other words, the support mechanism 43 having the Y-axis conveyor guide 71 and the conveyor support member 81 performs a function of supporting the movable linear conveyor 3 with respect to the fixed linear conveyor 2.

Further, the Y-axis conveyor guide 71 mounted on the fixed linear conveyor 2 guides the conveyor support member 81 mounted on the movable linear conveyor 3 in the Y direction. In other words, the support mechanism 43 having the Y-axis conveyor guide 71 and the conveyor support member 81 performs of a function of guiding the move of the movable linear conveyor 3 with respect to the fixed linear conveyor 2 in the Y direction.

Thus, the branch conveyance apparatus A includes the support mechanism 41 that supports an end portion 321 of the movable linear conveyor 3 on the Xl side with respect to the end portion 22r of the fixed linear conveyor 2 on the Xr side and the support mechanism 43 that supports an end portion 32r of the movable linear conveyor 3 on the Xr side with respect to the end portion 221 of the fixed linear conveyor 2 on the Xl side. With reference to FIGS. 4 and 5, an operation of the branch conveyance apparatus A in the Y direction will be described. As shown in FIG. 4, when the drive motor 531 drives the screw shaft 523a of the ball screw 523, the conveyor support member 61 fixed to the slider 525 (FIG. 3) is moved in the Y direction and the movable linear conveyor 3 fixed to the conveyor support member 61 is moved in the Y direction. Further, as shown in FIG. 5, the move of the movable linear conveyor 3 is guided in the Y direction by the Y-axis guide rail 731 of the Y-axis conveyor guide 71. Thus, the movable linear conveyor 3 is driven and guided in the Y direction by the single axis robot 51 and is guided in the Y direction by the Y-axis guide rail 731, to be thereby moved in the Y direction within the movable range Ym including the facing position Lf1 and the facing position Lf2.

In the first example described above, provided are the support mechanism 41 (first support mechanism) that supports the end portion 321 (first end portion) of the movable linear conveyor 3 on the Xl side (one side) in the X direction (conveyance direction) and the support mechanism 43 (second support mechanism) that supports the end portion 32r (second end portion) of the movable linear conveyor 3 on the Xr side (other side) in the X direction. Particularly, the support mechanism 41 has the conveyor support member 61 (first movable member) that is attached to the end portion 321 of the movable linear conveyor 3 and the single axis robot 51 (first guide part) that is attached to the fixed linear conveyor 2a (first fixed linear conveyor) and guides the conveyor support member 61 in the Y direction (switching direction). By the support mechanism 41 having the conveyor support member 61 and the single axis robot 51 thus, the end portion 321 of the movable linear conveyor 3 can be firmly supported with respect to the fixed linear conveyor 2a. Therefore, even when a load on the movable linear conveyor 3 is biased to the end portion 321, it is possible to suppress sinking of the end portion 321 with respect to the fixed linear conveyor 2a and thereby appropriately perform the transfer of the table conveyor T between the fixed linear conveyor 2a and the end portion 321. Further, the support mechanism 43 has the conveyor support member 81 (second movable member) that is attached to the end portion 32r of the movable linear conveyor 3 and the Y-axis conveyor guide 71 (second guide part) that is attached to the fixed linear conveyor 2b (second fixed linear conveyor) and guides the conveyor support member 81 in the Y direction. By the support mechanism 43 having the conveyor support member 81 and the Y-axis conveyor guide 71 thus, the end portion 32r of the movable linear conveyor 3 can be firmly supported with respect to the fixed linear conveyor 2b. Therefore, even when the load on the movable linear conveyor 3 is biased to the end portion 32r, it is possible to suppress sinking of the end portion 32r with respect to the fixed linear conveyor 2b and thereby appropriately perform the transfer of the table conveyor T between the fixed linear conveyor 2b and the end portion 32r. As a result, it becomes possible to appropriately perform the transfer of the table conveyor T between the movable linear conveyor 3 and each of the fixed linear conveyors 2a and 2b arranged on both the sides of the movable linear conveyor 3 by supporting the movable linear conveyor 3 against the bias of the load on the movable linear conveyor 3.

Further, the single axis robot 51 has the drive motor 531 (drive source), and the drive motor 531 drives the conveyor support member 61 in the Y direction, to thereby move the movable linear conveyor 3 in the Y direction. In other words, by the drive motor 531 of the single axis robot 51, it is possible to move the movable linear conveyor 3 in the Y direction between the facing position Lf1 (first position) and the facing position Lf2 (second position). Particularly, both the functions of driving and guiding the conveyor support member 61 can be compactly achieved by a single functional part, i.e., the single axis robot 51, and it is therefore possible to ensure reduction in the size of the branch conveyance apparatus A (conveyance path switching apparatus).

Furthermore, the single axis robot 51 has the ball screw 523 arranged in parallel with the Y direction. Then, the conveyor support member 61 is connected to the nut 523b of the ball screw 523 and the drive motor 531 rotates the screw shaft 523a of the ball screw 523, to thereby drive the conveyor support member 61 in the Y direction. In such a configuration, it is possible to move the movable linear conveyor 3 in the Y direction by the ball screw type single axis robot 51 arranged on the Xl side of the movable linear conveyor 3.

Further, the conveyor support member 61 has the upper surface 612t (first support surface) facing the bottom surface 33b of the end portion 321 of the movable linear conveyor 3 from below, and by butting the upper surface 612t against the bottom surface 33b of the end portion 321, the conveyor support member 61 and the end portion 321 of the movable linear conveyor 3 are positioned. Furthermore, the single axis robot 51 has the upper surface 521t (first mounting surface) to be butted against the bottom surface 23b of each of the fixed linear conveyors 2a and 2d from below, and by butting the upper surface 521t against the bottom surface 23b of each of the fixed linear conveyors 2a and 2d, the single axis robot 51 and the fixed linear conveyors 2a and 2d are positioned. Moreover, the conveyor support member 81 has the upper surface 812t (second support surface) facing the bottom surface 33b of the end portion 32r of the movable linear conveyor 3 from below, and by butting the upper surface 812t against the bottom surface 33b of the end portion 32r, the conveyor support member 81 and the end portion 32r of the movable linear conveyor 3 are positioned. Further, the Y-axis conveyor guide 71 has the upper surface 722*t* (second mounting surface) to be butted against the bottom surface 23*b* of each of the fixed linear conveyors 2*b* and 2*c* from below, and by butting the upper surface 722*t* against the bottom surface 23*b* of each of the fixed linear conveyors 2*b* and 2*c*, the Y-axis conveyor guide 71 and the fixed linear conveyors 2*b* and 2*c* are positioned. In such a configuration, by butting the upper surface 521*t* of the branch conveyance apparatus A against the bottom surface 23*b* of each of the fixed linear conveyors 2*a* and 2*d* and butting the upper surface 722*t* of the branch conveyance apparatus A against the bottom surface 23*b* of each of the fixed linear conveyors 2*b* and 2*c*, it is possible to easily and conveniently position the fixed linear conveyors 2*a*, 2*b*, 2*c*, and 2*d* and the movable linear conveyor 3. For this reason, it is possible to reduce operator's load required for an operation of mounting the branch conveyance apparatus A onto the fixed linear conveyors 2*a*, 2*b*, 2*c*, and 2*d*.

Further, the fixed linear conveyor 2*c* (third fixed linear conveyor) faces the facing position Lf1 (third position) from the Xr side in the X direction, and the movable linear conveyor 3 transfers the table conveyor T to/from the fixed linear conveyor 2*c* while stopping at the facing position Lf1. Furthermore, the Y-axis conveyor guide 71 of the support mechanism 43 is mounted on the fixed linear conveyor 2*c*. By the support mechanism 43, the end portion 32*r* of the movable linear conveyor 3 can be firmly supported with respect to the fixed linear conveyor 2*c*. Therefore, even when the load on the movable linear conveyor 3 is biased to the end portion 32*r*, it is possible to suppress sinking of the end portion 32*r* with respect to the fixed linear conveyor 2*c* and thereby appropriately perform the transfer of the table conveyor T between the fixed linear conveyor 2*c* and the end portion 32*r*.

Further, the fixed linear conveyor 2*d* (fourth fixed linear conveyor) faces the facing position Lf2 (fourth position) from the Xl side in the X direction, and the movable linear conveyor 3 transfers the table conveyor T to/from the fixed linear conveyor 2*d* while stopping at the facing position Lf2. Furthermore, the single axis robot 51 of the support mechanism 41 is mounted on the fixed linear conveyor 2*d*. By the support mechanism 41, the end portion 321 of the movable linear conveyor 3 can be firmly supported with respect to the fixed linear conveyor 2*d*. Therefore, even when the load on the movable linear conveyor 3 is biased to the end portion 321, it is possible to suppress sinking of the end portion 321 with respect to the fixed linear conveyor 2*d* and thereby appropriately perform the transfer of the table conveyor T between the fixed linear conveyor 2*d* and the end portion 321.

Further, the fixing plate 13 (first mounting member) used for mounting the support mechanism 41 onto the mounting frame 11*r* (first mounting frame) on which the fixed linear conveyors 2*a* and 2*d* are mounted and the fixing plate 13 (second mounting member) used for mounting the support mechanism 43 onto the mounting frame 11*l* (second mounting frame) on which the fixed linear conveyors 2*b* and 2*c* are mounted are provided in the branch conveyance apparatus A. In such a configuration, by supporting the support mechanisms 41 and 43 by the respective fixing plates 13, it is possible to reduce a load to be added to the fixed linear conveyors 2*a*, 2*b*, 2*c*, and 2*d*.

FIG. 6 is an elevational view schematically showing a second example of the branch conveyance apparatus included in the substrate conveyance system. Herein, description will be made, centering on the difference between the second example and the first example shown in FIG. 3, and common constituent elements are represented by corresponding reference signs and description thereof will be omitted as appropriate. In this second example, the support mechanism 43 has the single axis robot 51 instead of the Y-axis conveyor guide 71 (in the first example) and the conveyor support member 61 instead of the conveyor support member 81 (in the first example). In other words, the support mechanism 43 has the configuration common to those of the support mechanism 41.

In the support mechanism 43, the upper surface 521*t* of the single axis robot 51 comes into contact with the bottom surface 23*b* of the end portion 221 of the fixed linear conveyor 2 from below. Then, at the end portion 221, the upper surface 521*t* of the single axis robot 51 is fastened and fixed to the flange 23 of the fixed linear conveyor 2 with screws S. Further, in the support mechanism 43, the conveyor support member 61 is fixed to the slider 525 of the single axis robot 51, and the upper surface 612*t* of the conveyor support member 61 comes into contact with the bottom surface 33*b* of the end portion 32*r* of the movable linear conveyor 3 from below and is fastened and fixed to the flange 33 of the movable linear conveyor 3 at the end portion 32*r*. Therefore, the support mechanism 43 can support the end portion 32*r* of the movable linear conveyor 3 with respect to the end portion 221 of the fixed linear conveyor 2 and can also drive and guide the end portion 32*r* of the movable linear conveyor 3 in the Y direction.

Thus, in the second example, the support mechanism 43 has the conveyor support member 61 (second movable member) that is attached to the end portion 32*r* of the movable linear conveyor 3 and the single axis robot 51 (second guide part) that is attached to the fixed linear conveyor 2*b* (second fixed linear conveyor) and guides the conveyor support member 61 in the Y direction (switching direction). By the support mechanism 43 having the conveyor support member 61 and the single axis robot 51 thus, the end portion 32*r* of the movable linear conveyor 3 can be firmly supported with respect to the fixed linear conveyor 2*b*. Therefore, even when the load on the movable linear conveyor 3 is biased to the end portion 32*r*, it is possible to suppress sinking of the end portion 32*r* with respect to the fixed linear conveyor 2*b* and thereby appropriately perform the transfer of the table conveyor T between the fixed linear conveyor 2*b* and the end portion 32*r*. The support mechanism 43 can have the same effect on the fixed linear conveyor 2*c* (third fixed linear conveyor).

Further, the single axis robot 51 (first guide part) of the support mechanism 41 has the drive motor 531 (first drive source), and the single axis robot 51 (second guide part) of the support mechanism 43 has the drive motor 531 (second drive source). Then, the drive motor 531 of each of the support mechanisms 41 and 43 drives the conveyor support member 61 (first or second movable member) in the Y direction, to thereby move the movable linear conveyor 3 in the Y direction. In such a configuration, by the drive motor 531 of each of the support mechanisms 41 and 43, the movable linear conveyor 3 can be moved in the Y direction between the facing position Lf1 and the facing position Lf2. Particularly, both the functions of driving and guiding the conveyor support member 61 in each of the support mechanisms 41 and 43 can be compactly achieved by a single functional part, i.e., the single axis robot 51, and it is therefore possible to ensure reduction in the size of the branch conveyance apparatus A (conveyance path switching apparatus).

Furthermore, in each of the support mechanisms 41 and 43, the single axis robot 51 (first/second guide part) has the ball screw 523 (first/second ball screw) arranged in parallel with the Y direction. In contrast to this, the conveyor support member 61 (first/second movable member) is connected to the nut 523*b* of the ball screw 523 and the drive motor 531 rotates the screw shaft 523*a* of the ball screw 523, to thereby drive the conveyor support member 61 in the Y direction. In such a configuration, it is possible to move the movable linear conveyor 3 in the Y direction by the ball screw type single axis robot 51 arranged on the X1 side of the movable linear conveyor 3 and the ball screw type single axis robot 51 arranged on the Xr side of the movable linear conveyor 3.

As shown in the second example of FIG. 6, in the branch conveyance apparatus A in which the single axis robots 51 are provided on both the sides of the movable linear conveyor 3, the control part 100 may control the drive motor 531 of each of the single axis robots 51 as follows.

FIG. 7 is a flowchart showing an exemplary transfer control in the branch conveyance apparatus including the two single axis robots. The flowchart of this figure is executed by the control of the control part 100 when the table conveyor T is transferred between the fixed linear conveyor 2 and the movable linear conveyor 3.

In Step S101, it is determined whether to perform the transfer of the table conveyor T. Then, when it is determined that the table conveyor T should be transferred ("YES" in Step S101), the process goes to Step S102. In Step S102, it is determined whether the fixed linear conveyor 2 to be used for transferring the table conveyor T to/from the movable linear conveyor 3 is the fixed linear conveyor 2*a* or 2*d* on the X1 side of the movable linear conveyor 3 or the fixed linear conveyor 2*b* or 2*c* on the Xr side of the movable linear conveyor 3.

When the target fixed linear conveyor 2 is the fixed linear conveyor on the X1 side, the control part 100 performs the above-described feedback control on the drive motor 531 of the support mechanism 41 on the X1 side, to thereby position the table conveyor T at the facing position Lf1 or the facing position Lf2 while stopping the operation of the drive motor 531 of the support mechanism 43 on the Xr side (Step S103). At that time, since the drive motor 531 of the support mechanism 43 is stopped (servo free), the single axis robot 51 of the support mechanism 43 does not perform the function of driving the movable linear conveyor 3 but performs only the function of guiding the movable linear conveyor 3 in the Y direction. Thus, when the movable linear conveyor 3 is positioned at the facing position Lf1 or the facing position Lf2, the table conveyor T is transferred between the movable linear conveyor 3 and fixed linear conveyor 2 on the X1 side of the movable linear conveyor 3 (Step S104).

When the target fixed linear conveyor 2 is the fixed linear conveyor on the Xr side, the control part 100 performs the above-described feedback control on the drive motor 531 of the support mechanism 43 on the Xr side, to thereby position the table conveyor T at the facing position Lf1 or the facing position Lf2 while stopping the operation of the drive motor 531 of the support mechanism 41 on the X1 side (Step S105). At that time, since the drive motor 531 of the support mechanism 41 is stopped (servo free), the single axis robot 51 of the support mechanism 41 does not perform the function of driving the movable linear conveyor 3 but performs only the function of guiding the movable linear conveyor 3 in the Y direction. Thus, when the movable linear conveyor 3 is positioned at the facing position Lf1 or the facing position Lf2, the table conveyor T is transferred between the movable linear conveyor 3 and fixed linear conveyor 2 on the Xr side of the movable linear conveyor 3 (Step S106).

In the transfer control shown in FIG. 7, the control part 100 controls an operation of the drive motor 531 (first/second drive source) of each of the support mechanisms 41 and 43. Particularly, when transferring the table conveyor T between the movable linear conveyor 3 and the fixed linear conveyor 2*a* or 2*d* on the X1 side, the control part 100 controls the position of the movable linear conveyor 3 at the facing position Lf1 or Lf2 by the operation of the drive motor 531 of the support mechanism 41 on the X1 side while stopping the operation of the drive motor 531 of the support mechanism 43 on the Xr side (Step S103). Further, when transferring the table conveyor T between the movable linear conveyor 3 and the fixed linear conveyor 2*b* or 2*c* on the Xr side, the control part 100 controls the position of the movable linear conveyor 3 at the facing position Lf1 or Lf2 by the operation of the drive motor 531 of the support mechanism 43 on the Xr side while stopping the operation of the drive motor 531 of the support mechanism 41 on the X1 side (Step S105). In such a configuration, when transferring the table conveyor T between the movable linear conveyor 3 and the fixed linear conveyor 2*a* or 2*d*, it is possible to accurately position the movable linear conveyor 3 with respect to the fixed linear conveyor 2*a* or 2*d* by the drive motor 531 of the support mechanism 41 while preventing interference of the operation of the drive motor 531 of the support mechanism 43, thereby smoothly transferring the table conveyor T. Further, when transferring the table conveyor T between the movable linear conveyor 3 and the fixed linear conveyor 2*b* or 2*c*, it is possible to accurately position the movable linear conveyor 3 with respect to either of the fixed linear conveyors 2*b* and 2*c* by the drive motor 531 of the support mechanism 43 while preventing interference of the operation of the drive motor 531 of the support mechanism 41, thereby smoothly transferring the table conveyor T.

FIG. 8 is an elevational view schematically showing a third example of the branch conveyance apparatus included in the substrate conveyance system, and FIG. 9 is a side elevational view schematically showing an exemplary link mechanism included in the branch conveyance apparatus shown in FIG. 8. Herein, description will be made, centering on the difference between the third example and the first example shown in FIG. 3, and common constituent elements are represented by corresponding reference signs and description thereof will be omitted as appropriate. In this third example, the support mechanism 41 has the Y-axis conveyor guide 71 instead of the single axis robot 51 (in the first example) and the conveyor support member 81 instead of the conveyor support member 61 (in the first example). In other words, the support mechanism 41 has the configuration common to those of the support mechanism 43.

In the support mechanism 41, the upper surface 722*t* of the Y-axis conveyor guide 71 comes into contact with the bottom surface 23*b* of the end portion 22*r* of the fixed linear conveyor 2 from below. Then, at the end portion 22*r*, the upper surface 722*t* of the Y-axis conveyor guide 71 is fastened and fixed to the flange 23 of the fixed linear conveyor 2 with screws S. Further, in the support mechanism 41, the conveyor support member 81 is fixed to the slider 732 of the Y-axis conveyor guide 71, and the upper surface 812*t* of the conveyor support member 81 comes into contact with the bottom surface 33*b* of the end portion 321 of the movable linear conveyor 3 from below and is fastened and fixed to the flange 33 of the movable linear conveyor 3 at the end portion 321. Therefore, the support mechanism 41 can support the end portion 321 of the movable linear conveyor 3 with respect to the end portion 22r of the fixed linear conveyor 2 and can also guide the end portion 321 of the movable linear conveyor 3 in the Y direction.

Further, in the conveyor moving unit 4 shown in FIG. 8, on a support frame 18 placed on the base plate 19, the single axis robot 51 is disposed in the Y direction. Then, the single axis robot 51 and the movable linear conveyor 3 are connected to each other with a link mechanism 9. As shown in FIG. 9, the link mechanism 9 has a mounting plate 91 and a spherical bearing 92 fixed to an upper surface of the mounting plate 91. Furthermore, the link mechanism 9 also has a mounting plate 94 provided above the mounting plate 91 and a spherical bearing 95 fixed to a lower surface of the mounting plate 94.

Moreover, the link mechanism 9 has a rod 97 with which the spherical bearing 92 and the spherical bearing 95 are connected to each other, and one end 971 of this rod 97 is received by the spherical bearing 95 and the other end 972 of the rod 97 opposite to the one end 971 is received by the spherical bearing 92. This rod 97 has two rotational degrees of freedom with respect to the spherical bearing 92 and two rotational degrees of freedom with respect to the spherical bearing 95. In other words, the rod 97 can rotate with respect to the spherical bearing 92 and can also rotate with respect to the spherical bearing 95 about two rotation axes orthogonal to each other, respectively.

Then, the mounting plate 91 is fastened and fixed to an upper surface of the slider 525 of the single axis robot 51 with screws S. Further, the mounting plate 94 is fastened and fixed to the bottom surface 33b of the flange 33 of the movable linear conveyor 3 with screws S. This mounting plate 94 is fixed to the movable linear conveyor 3 at a center position between the end portion 321 and the end portion 32r of the movable linear conveyor 3 in the X direction. Therefore, when the drive motor 531 drives the ball screw 523 to drive the slider 525 in the Y direction, the movable linear conveyor 3 connected to the slider 525 with the link mechanism 9 is moved in the Y direction.

Thus, in the third example, provided are the link mechanism 9 mounted on the movable linear conveyor 3 at the mounting position (position of the mounting plate 94) between the end portion 321 and the end portion 32r of the movable linear conveyor 3 and the single axis robot 51 driving the link mechanism 9 in the Y direction to thereby move the movable linear conveyor 3 in the Y direction. The link mechanism 9 has the spherical bearing 95 (first spherical bearing) mounted on the movable linear conveyor 3 via the mounting plate 94, the spherical bearing 92 (second spherical bearing) mounted on the slider 525 of the single axis robot 51 via the mounting plate 91, and the rod 97 with which the spherical bearing 95 and the spherical bearing 92 are connected to each other. Then, the one end 971 of the rod 97 is received by the spherical bearing 95 and the other end 972 of the rod 97 is received by the spherical bearing 92. In such a configuration, it is possible to absorb an error in the degree of parallelism between the Y-axis conveyor guide 71 of each of the support mechanisms 41 and 43 and the single axis robot 51 by the degrees of freedom of the spherical bearings 92 and 95. Therefore, it is possible to smoothly move the movable linear conveyor 3 in the Y direction.

Thus, in the above-described embodiment, the conveyance system 1 corresponds to one example of a "conveyance system" of the present disclosure, the mounting frame 11l corresponds to one example of a "first mounting frame" of the present disclosure, the mounting frame 11r corresponds to one example of a "second mounting frame" of the present disclosure, the fixing plate 13 corresponds to one example of either of "first/second mounting members" of the present disclosure, the control part 100 corresponds to one example of a "control part" of the present disclosure, the fixed linear conveyor 2a corresponds to one example of a "first fixed linear conveyor" of the present disclosure, the fixed linear conveyor 2b corresponds to one example of a "second fixed linear conveyor" of the present disclosure, the fixed linear conveyor 2c corresponds to one example of a "third fixed linear conveyor" of the present disclosure, the fixed linear conveyor 2d corresponds to one example of a "fourth fixed linear conveyor" of the present disclosure, the movable linear conveyor 3 corresponds to one example of a "movable linear conveyor" of the present disclosure, the end portion 321 corresponds to one example of a "first end portion" of the present disclosure, the end portion 32r corresponds to one example of a "second end portion" of the present disclosure, the support mechanism 41 corresponds to one example of a "first support mechanism" of the present disclosure, the support mechanism 43 corresponds to one example of a "second support mechanism" of the present disclosure, the branch conveyance apparatus A corresponds to one example of a "conveyance path switching apparatus" of the present disclosure, the facing position Lf1 corresponds to one example of a "first position" of the present disclosure, the facing position Lf1 corresponds to one example of a "third position" of the present disclosure, the facing position Lf2 corresponds to one example of a "second position" of the present disclosure, the facing position Lf2 corresponds to one example of a "fourth position" of the present disclosure, the table conveyor T corresponds to one example of a "conveyor table" of the present disclosure, the X direction corresponds to one example of a "conveyance direction" of the present disclosure, the Xl side corresponds to one example of "one side" of the present disclosure, the Xr side corresponds to one example of "other side" of the present disclosure, the Y direction corresponds to one example of a "switching direction" of the present disclosure, the movable range Ym corresponds to one example of a "movable range" of the present disclosure, the link mechanism 9 corresponds to one example of a "link mechanism" of the present disclosure, the single axis robot 51 corresponds to one example of a "single axis robot" of the present disclosure, the spherical bearing 95 corresponds to one example of a "first spherical bearing" of the present disclosure, the spherical bearing 92 corresponds to one example of a "second spherical bearing" of the present disclosure, the rod 97 corresponds to one example of a "rod" of the present disclosure, one end 971 corresponds to one example of "one end" of the present disclosure, and the other end 972 corresponds to one example of "the other end" of the present disclosure.

In the first example (FIG. 3), the conveyor support member 61 of the support mechanism 41 corresponds to one example of a "first movable member" of the present disclosure, the single axis robot 51 of the support mechanism 41 corresponds to one example of a "first guide part" of the present disclosure, the conveyor support member 81 of the support mechanism 43 corresponds to one example of a "second movable member" of the present disclosure, and the Y-axis conveyor guide 71 of the support mechanism 43 corresponds to one example of a "second guide part" of the present disclosure.

In the second example (FIG. 6), the conveyor support member 61 of the support mechanism 41 corresponds to one example of a "first movable member" of the present disclosure, the single axis robot 51 of the support mechanism 41 corresponds to one example of a "first guide part" of the present disclosure, the conveyor support member 61 of the support mechanism 43 corresponds to one example of a "second movable member" of the present disclosure, and the single axis robot 51 of the support mechanism 43 corresponds to one example of a "second guide part" of the present disclosure.

In the third example (FIG. 8), the conveyor support member 81 of the support mechanism 41 corresponds to one example of a "first movable member" of the present disclosure, the Y-axis conveyor guide 71 of the support mechanism 41 corresponds to one example of a "first guide part" of the present disclosure, the conveyor support member 81 of the support mechanism 43 corresponds to one example of a "second movable member" of the present disclosure, and the Y-axis conveyor guide 71 of the support mechanism 43 corresponds to one example of a "second guide part" of the present disclosure.

In the first example (FIG. 3), the upper surface 612*t* corresponds to one example of a "first support surface" of the present disclosure, the upper surface 521*t* corresponds to one example of a "first mounting surface" of the present disclosure, the upper surface 812*t* corresponds to one example of a "second support surface" of the present disclosure, and the upper surface 722*t* corresponds to one example of a "second mounting surface" of the present disclosure.

In the second example (FIG. 6), the upper surface 612*t* on the Xl side corresponds to one example of a "first support surface" of the present disclosure, the upper surface 521*t* on the Xl side corresponds to one example of a "first mounting surface" of the present disclosure, the upper surface 612*t* on the Xr side corresponds to one example of a "second support surface" of the present disclosure, and the upper surface 521*t* on the Xr side corresponds to one example of a "second mounting surface" of the present disclosure.

In the third example (FIG. 8), the upper surface 812*t* on the Xl side corresponds to one example of a "first support surface" of the present disclosure, the upper surface 722*t* on the Xl side corresponds to one example of a "first mounting surface" of the present disclosure, the upper surface 812*t* on the Xr side corresponds to one example of a "second support surface" of the present disclosure, and the upper surface 722*t* on the Xr side corresponds to one example of a "second mounting surface" of the present disclosure.

Further, the present disclosure is not limited to the above-described embodiment, and numerous modifications and variations can be added to those described above without departing from the scope of the disclosure. For example, the above-described branch conveyance apparatus A does not necessarily need the base plate 19. Therefore, the branch conveyance apparatus A may be directly placed on the installation surface without using the base plate 19.

Furthermore, the number of and the arrangement of fixed linear conveyors 2 used in the conveyance system 1 can be changed as appropriate. From the example shown in FIGS. 1A to 1E, for example, modifications such as shifting the position of the fixed linear conveyor 2c in the Y direction, shifting the position of the fixed linear conveyor 2d in the Y direction, omitting the fixed linear conveyor 2c, omitting the fixed linear conveyor 2d, or the like can be made. Further, the number of fixed linear conveyors 2 arranged in parallel on the Xr side or the Xl side in the X direction is not limited to two but may be three or more. The above-described support mechanisms 41 and 43 for supporting the movable linear conveyor 3 from both the sides can also produce the same effect as above on three or more fixed linear conveyors 2 provided thus.

Furthermore, various changes can be made on the direction (switching direction) in which the movable linear conveyor 3 is driven. Therefore, the direction in which the movable linear conveyor 3 is driven is not limited to the horizontal direction but may be the vertical direction. In this case, the branch conveyance apparatus A can branch the conveyance path of the table conveyor T in the vertical direction.

What is claimed is:

1. A conveyance path switching apparatus, comprising:
    a movable linear conveyor configured to convey a conveyor table in a predetermined conveyance direction;
    a first support mechanism configured to support a first end portion which is an end portion of the movable linear conveyor on one side in the conveyance direction; and
    a second support mechanism configured to support a second end portion which is an end portion of the movable linear conveyor on other side opposite to the one side in the conveyance direction,
    wherein the first support mechanism and the second support mechanism are configured to support the movable linear conveyor which is configured to move in a switching direction inclined with respect to the conveyance direction within a movable range including a first position and a second position which are different from each other in the switching direction,
    a first fixed linear conveyor faces the first position from the one side in the conveyance direction,
    a second fixed linear conveyor faces the second position from the other side in the conveyance direction,
    the movable linear conveyor is configured to transfer the conveyor table to/from the first fixed linear conveyor while stopping at the first position,
    the movable linear conveyor is configured to transfer the conveyor table to/from the second fixed linear conveyor while stopping at the second position,
    the first support mechanism has a first movable member which is attached to the first end portion of the movable linear conveyor and a first guide part which is attached to the first fixed linear conveyor and configured to guide the first movable member in the switching direction, and
    the second support mechanism has a second movable member which is attached to the second end portion of the movable linear conveyor and a second guide part which is attached to the second fixed linear conveyor and configured to guide the second movable member in the switching direction.

2. The conveyance path switching apparatus according to claim 1, wherein
    the first guide part has a drive source that is configured to drive the first movable member in the switching direction to move the movable linear conveyor in the switching direction.

3. The conveyance path switching apparatus according to claim 2, wherein
    the first guide part has a ball screw extending in parallel with the switching direction,
    the first movable member is connected to a nut of the ball screw, and
    the drive source is configured to rotate a screw shaft of the ball screw to drive the first movable member in the switching direction.

4. The conveyance path switching apparatus according to claim 1, wherein the first guide part has a first drive source, the second guide part has a second drive source, the first drive source is configured to drive the first movable member in the switching direction to move the movable linear conveyor in the switching direction, and the second drive source is configured to drive the second movable member in the switching direction to move the movable linear conveyor in the switching direction.

5. The conveyance path switching apparatus according to claim 4, wherein the first guide part has a first ball screw extending in parallel with the switching direction, the first movable member is connected to a nut of the first ball screw, the first drive source is configured to rotate a screw shaft of the first ball screw to drive the first movable member in the switching direction, the second guide part has a second ball screw extending in parallel with the switching direction, the second movable member is connected to a nut of the second ball screw, and the second drive source is configured to rotate a screw shaft of the second ball screw to drive the second movable member in the switching direction.

6. The conveyance path switching apparatus according to claim 4, further comprising:

a control part configured to control an operation of the first drive source and an operation of the second drive source, wherein the control part is configured to control a position of the movable linear conveyor at the first position by the operation of the first drive source while stopping the operation of the second drive source when causing the movable linear conveyor and the first fixed linear conveyor to face each other in the conveyance direction, and the control part is configured to control a position of the movable linear conveyor at the second position by the operation of the second drive source while stopping the operation of the first drive source when causing the movable linear conveyor and the second fixed linear conveyor to face each other in the conveyance direction.

7. The conveyance path switching apparatus according to claim 1, further comprising:

a link mechanism mounted on the movable linear conveyor at a mounting position between the first end portion and the second end portion in the conveyance direction; and a single axis robot configured to move the movable linear conveyor in the switching direction by driving the link mechanism in the switching direction, wherein the link mechanism has a first spherical bearing attached to the movable linear conveyor, a second spherical bearing attached to a slider of the single axis robot, and a rod with which the first spherical bearing and the second spherical bearing are connected to each other, and one end of the rod is received by the first spherical bearing and other end of the rod opposite to the one end is received by the second spherical bearing.

8. The conveyance path switching apparatus according to claim 1, wherein the first movable member has a first support surface facing a bottom surface of the first end portion from below, the first support surface is butted against the bottom surface of the first end portion to thereby position the first movable member and the first end portion, the first guide part has a first mounting surface to be butted against a bottom surface of the first fixed linear conveyor from below, the first mounting surface is butted against the bottom surface of the first fixed linear conveyor to position the first guide part and the first fixed linear conveyor, the second movable member has a second support surface facing a bottom surface of the second end portion from below, the second support surface is butted against the bottom surface of the second end portion to position the second movable member and the second end portion, the second guide part has a second mounting surface to be butted against a bottom surface of the second fixed linear conveyor from below, and the second mounting surface is butted against the bottom surface of the second fixed linear conveyor to position the second guide part and the second fixed linear conveyor.

9. The conveyance path switching apparatus according to claim 1, wherein the movable range includes a third position different from at least the second position among the first position and the second position, a third fixed linear conveyor faces the third position from the other side in the conveyance direction, the movable linear conveyor is configured to transfer the conveyor table to/from the third fixed linear conveyor while stopping at the third position, and the second guide part of the second support mechanism is mounted onto the third fixed linear conveyor.

10. The conveyance path switching apparatus according to claim 1, wherein the movable range includes a fourth position different from at least the first position among the first position and the second position, a fourth fixed linear conveyor faces the fourth position from the one side in the conveyance direction, the movable linear conveyor is configured to transfer the conveyor table to/from the fourth fixed linear conveyor while stopping at the fourth position, and the first guide part of the first support mechanism is mounted onto the fourth fixed linear conveyor.

11. The conveyance path switching apparatus according to claim 1, further comprising:

a first mounting member configured to mount the first support mechanism onto a first mounting frame on which the first fixed linear conveyor is mounted, and a second mounting member configured to mount the second support mechanism onto a second mounting frame on which the second fixed linear conveyor is mounted.

12. A conveyance system, comprising:

a first fixed linear conveyor configured to drive a conveyor table in a conveyance direction;

a second fixed linear conveyor configured to drive the conveyor table in the conveyance direction; and a conveyance path switching apparatus according to claim 1 which is arranged between the first fixed linear conveyor and the second fixed linear conveyor in the conveyance direction.

13. A conveyance path switching method, comprising:

moving a movable linear conveyor configured to convey a conveyor table in a predetermined conveyance direction, in a switching direction inclined with respect to the conveyance direction within a movable range including a first position and a second position which are different from each other in the switching direction, wherein a first end portion which is an end portion of the movable linear conveyor on one side in the conveyance direction is supported by a first support mechanism; and a second end portion which is an end portion of the movable linear conveyor on other side opposite to the one side in the conveyance direction is supported by a second support mechanism;

a first fixed linear conveyor faces the first position from the one side in the conveyance direction, a second fixed linear conveyor faces the second position from the other side in the conveyance direction, the movable linear conveyor is configured to transfer the conveyor table to/from the first fixed linear conveyor while stopping at the first position, the movable linear conveyor is configured to transfer the conveyor table to/from the second fixed linear conveyor while stopping at the second position, the first support mechanism has a first movable member which is attached to the first end portion of the movable linear conveyor and a first guide part which is attached to the first fixed linear conveyor and guides the first movable member in the switching direction, and the second support mechanism has a second movable member which is attached to the second end portion of the movable linear conveyor and a second guide part which is attached to the second fixed linear conveyor and guides the second movable member in the switching direction.

14. The conveyance path switching apparatus according to claim 5, further comprising:

a control part configured to control an operation of the first drive source and an operation of the second drive source, wherein the control part is configured to control a position of the movable linear conveyor at the first position by the operation of the first drive source while stopping the operation of the second drive source when causing the movable linear conveyor and the first fixed linear conveyor to face each other in the conveyance direction, and the control part is configured to control a position of the movable linear conveyor at the second position by the operation of the second drive source while stopping the operation of the first drive source when causing the movable linear conveyor and the second fixed linear conveyor to face each other in the conveyance direction.

15. The conveyance path switching apparatus according to claim 2, wherein the first movable member has a first support surface facing a bottom surface of the first end portion from below, the first support surface is butted against the bottom surface of the first end portion to thereby position the first movable member and the first end portion, the first guide part has a first mounting surface to be butted against a bottom surface of the first fixed linear conveyor from below, the first mounting surface is butted against the bottom surface of the first fixed linear conveyor to position the first guide part and the first fixed linear conveyor, the second movable member has a second support surface facing a bottom surface of the second end portion from below, the second support surface is butted against the bottom surface of the second end portion to position the second movable member and the second end portion, the second guide part has a second mounting surface to be butted against a bottom surface of the second fixed linear conveyor from below, and the second mounting surface is butted against the bottom surface of the second fixed linear conveyor to position the second guide part and the second fixed linear conveyor.

16. The conveyance path switching apparatus according to claim 3, wherein the first movable member has a first support surface facing a bottom surface of the first end portion from below, the first support surface is butted against the bottom surface of the first end portion to thereby position the first movable member and the first end portion, the first guide part has a first mounting surface to be butted against a bottom surface of the first fixed linear conveyor from below, the first mounting surface is butted against the bottom surface of the first fixed linear conveyor to position the first guide part and the first fixed linear conveyor, the second movable member has a second support surface facing a bottom surface of the second end portion from below, the second support surface is butted against the bottom surface of the second end portion to position the second movable member and the second end portion, the second guide part has a second mounting surface to be butted against a bottom surface of the second fixed linear conveyor from below, and the second mounting surface is butted against the bottom surface of the second fixed linear conveyor to position the second guide part and the second fixed linear conveyor.

17. The conveyance path switching apparatus according to claim 2, wherein the movable range includes a third position different from at least the second position among the first position and the second position, a third fixed linear conveyor faces the third position from the other side in the conveyance direction, the movable linear conveyor is configured to transfer the conveyor table to/from the third fixed linear conveyor while stopping at the third position, and the second guide part of the second support mechanism is mounted onto the third fixed linear conveyor.

18. The conveyance path switching apparatus according to claim 2, wherein the movable range includes a fourth position different from at least the first position among the first position and the second position, a fourth fixed linear conveyor faces the fourth position from the one side in the conveyance direction, the movable linear conveyor is configured to transfer the conveyor table to/from the fourth fixed linear conveyor while stopping at the fourth position, and the first guide part of the first support mechanism is mounted onto the fourth fixed linear conveyor.

19. The conveyance path switching apparatus according to claim 2, further comprising:

a first mounting member configured to mount the first support mechanism onto a first mounting frame on which the first fixed linear conveyor is mounted, and a second mounting member configured to mount the second support mechanism onto a second mounting frame on which the second fixed linear conveyor is mounted.

20. A conveyance system, comprising:

a first fixed linear conveyor configured to drive a conveyor table in a conveyance direction;

a second fixed linear conveyor configured to drive the conveyor table in the conveyance direction; and a conveyance path switching apparatus according to claim 2 which is arranged between the first fixed linear conveyor and the second fixed linear conveyor in the conveyance direction.

\*  \*  \*  \*  \*